(12) United States Patent
Maruyama et al.

(10) Patent No.: US 7,814,224 B2
(45) Date of Patent: Oct. 12, 2010

(54) INFORMATION PROCESSOR DEACTIVATES COMMUNICATION PROCESSING FUNCTION WITHOUT PASSING INTERRUPT REQUEST FOR PROCESSING WHEN DETECTING TRAFFIC INBOUND IS IN OVER-TRAFFIC STATE

(75) Inventors: Tatsuya Maruyama, Hitachi (JP); Tsutomu Yamada, Hitachinaka (JP); Hideaki Suzuki, Hitachi (JP); Norihisa Yanagihara, Tokyo (JP); Makiko Naemura, Tokyo (JP)

(73) Assignee: Hitachi Industrial Equipment Systems Co., Tokyo (JP)

( * ) Notice: Subject to any disclaimer, the term of this patent is extended or adjusted under 35 U.S.C. 154(b) by 443 days.

(21) Appl. No.: 12/019,231

(22) Filed: Jan. 24, 2008

(65) Prior Publication Data

US 2008/0195732 A1 Aug. 14, 2008

(30) Foreign Application Priority Data

Feb. 9, 2007 (JP) .............................. 2007-029941

(51) Int. Cl.
*G06F 15/16* (2006.01)
(52) U.S. Cl. ...................................... 709/235; 709/232
(58) Field of Classification Search ................. 709/232, 709/233, 234, 235, 238, 239; 370/231, 229, 370/232
See application file for complete search history.

(56) References Cited

U.S. PATENT DOCUMENTS

| | | | | |
|---|---|---|---|---|
| 2003/0158965 A1* | 8/2003 | Koester | ...................... | 709/239 |
| 2004/0246895 A1* | 12/2004 | Feyerabend | .................. | 370/229 |
| 2005/0182849 A1* | 8/2005 | Chandrayana et al. | ...... | 709/235 |
| 2005/0237936 A1* | 10/2005 | Verma et al. | ................. | 370/232 |
| 2006/0075084 A1* | 4/2006 | Lyon | .......................... | 709/223 |
| 2006/0092841 A1* | 5/2006 | Lloyd et al. | .................. | 370/231 |
| 2006/0136175 A1 | 6/2006 | Suzuki et al. | | |

FOREIGN PATENT DOCUMENTS

| | | |
|---|---|---|
| JP | 2003-283555 | 10/2003 |
| JP | 2005-167344 | 6/2005 |

OTHER PUBLICATIONS

Eric Byres P.E. et al, Worlds in Collision Ethernet and the Factory Floor.

* cited by examiner

*Primary Examiner*—Le Luu
(74) *Attorney, Agent, or Firm*—Antonelli, Terry, Stout & Kraus, LLP.

(57) ABSTRACT

An information processor disclosed herein prevents adverse impacts on higher priority processing due to extremely frequent receive processing when inbound traffic from a network is over-traffic state (under a DoS attack). The information processor attached to a network collects information about traffic state and, if it is determined that over-traffic state is present, deactivates the communication processing function without passing an interrupt request due to communication to the data processing block. In this state, the information processor continues to collect information about traffic state and, when it is determined that over-traffic state has terminated, starts to transfer an interrupt request to the data processing block and makes the communication processing function recover.

15 Claims, 24 Drawing Sheets

INFORMATION PROCESSOR DEACTIVATES COMMUNICATION PROCESSING FUNCTION WITHOUT PASSING INTERRUPT REQUEST FOR PROCESSING WHEN DETECTING TRAFFIC INBOUND IS IN OVER-TRAFFIC STATE

CLAIM OF PRIORITY

The present application claims priority from Japanese application serial No. 2007-029941, filed on Feb. 9, 2007, the contents of which are hereby incorporated by reference into this application.

FIELD OF THE INVENTION

The present invention relates to an information processor and an information processing system used by being connected with a network to take control over control equipment.

BACKGROUND OF THE INVENTION

One of attacks on information processors connected with a network is a DoS attack (Denial-of-Service attack).

The DoS attack intends to impose a heavy load of communication processing on an information processor by sending a huge amount of network traffic to the target information processor by the attack.

The DoS attack is to aim at a security hole of the target information processor or to simply request a great deal of service following a legitimate procedure.

DoS attacks by a plurality of senders are called DDoS (Distributed DoS).

Meanwhile, in industrial control systems, utilizing open computer networks is advanced.

Formerly, manufacturers used to use their proprietary protocols and information processors, and software running thereon also used to be of their proprietary specification.

At the present, the use of TCP/IP protocols which are standards for the Internet and the utilization of universal OS are advanced.

The adoption of these protocols and OS has various merits such as reducing equipment cost, affinity for connection with the Internet, abundance of engineers, which enabled construction of industrial monitoring systems at low cost.

In contrast to these merits, however, a concern about such systems is exposure to DoS attack. For example, if an information processor (such as a notebook computer or PDA) infected by a computer virus has connected to an industrial monitoring system, not only the information processor itself performs a DoS attack, but also the infection may spread to other information processors on which an universal OS and software with a security hole run.

Japanese Patent Application Laid-Open No. 2005-167344 discloses that: the amount of data received per unit time is measured, the amount of data received is restricted by decreasing the allowable amount of communication when the amount of data received exceeds a threshold value for receive restriction; the restriction on the amount of data received per unit time is canceled when the amount of data received becomes lower than a threshold value for canceling the receive restriction. In particular, a bandwidth is switched between 100 Mbps and 10 Mbps in Ethernet. This can restrict the amount of data received, while keeping communication on.

According to Japanese Patent Application Laid-Open No. 2003-283555, when a gateway detects DDoS attack-suspect packets, it notifies an upstream communication device of a restricted value of the network bandwidth for transmitting the attack-suspect packets. It is disclosed that the network bandwidth for transmitting the attack-suspect packets is restricted by repeating this notification procedure up to the most upstream point of the network. This can improve network congestion and prevent service stop due to DDoS attack.

However, in Japanese Patent Application Laid-Open No. 2005-167344, the amount of data received can be restricted, but the receive processing is not restricted; therefore, a negative impact due to DoS attack still occurs.

Particularly, because the performance of information processors used in industrial control systems is relatively low, restricting the amount of data received is not a solution.

In the case of Japanese Patent Application Laid-Open No. 2003-283555, because a restricted value of the network bandwidth is notified to an upstream network device in the network, it is impossible to cope with a DoS attack occurring in a same LAN.

A common problem associated with Japanese Patent Application Laid-Open No. 2005-167344 and Japanese Patent Application Laid-Open No. 2003-283555 is the load of processing to discriminate between DoS attack-suspect packets and significant packets after taking in packets.

In Japanese Patent Application Laid-Open No. 2005-167344, receive processing is performed for both DoS attack-suspect packets and significant packets, i.e., for all packets even under a condition in which the amount of data received is restricted.

In Japanese Patent Application Laid-Open No. 2003-283555, discrimination between DoS attack-suspect packets and significant packets should be made according to a predetermined evaluation criterion in order to detect DoS attack-suspect packets and restrict the network bandwidth therefor.

Under a situation of receiving a large amount of packets such as under a DoS attack, the processing for such discrimination itself becomes a burden for the information processor and there is a possibility of system down occurring in the worst case.

The present invention is intended to provide an information processor in which a risk of system down and overload of communication processing are avoided even if it is placed in over-traffic state such as under a DoS attack.

SUMMARY OF THE INVENTION

To solve the above noted problems, an aspect of the present invention resides in an information processor that is used in connection with a network and takes control over control equipment, the information processor comprising a communication block which receives packets from the network; a data processing block which processes received packets and generates control command data for controlling the control equipment; an interrupt controlling block which generates an interrupt request signal and controls input/output of the interrupt request signal to the data processing block; and a determination block which determines whether traffic inbound from the network is under over-traffic state or normal traffic state, based on information about interrupt occurrence output from at least one of the communication block, the data processing block, and the interrupt controlling block, and outputs a result of the determination to the interrupt controlling block, wherein the interrupt controlling block is configured such that, based on the result of the determination input from the determination block, if the result of the determination is that traffic inbound from the network is under over-traffic state, the interrupt controlling block shuts off the interrupt request signal from the interrupt controlling block to the data processing block, and if the result of the determination is that traffic inbound from the network is under normal traffic state, the interrupt controlling block outputs the interrupt request signal from the interrupt controlling block to the data processing block.

Another aspect of the invention resides in information processor that is used in connection with a plurality of networks and takes control over control equipment, the information processor comprising a plurality of communication blocks which transmit and receive packets to/from the plurality of networks; a data processing block which processes received packets and generates control command data for controlling the control equipment; and an interrupt controlling block which determines whether traffic inbound from the plurality of networks to which the information processor is connected is under over-traffic state or normal traffic state, based on information about interrupt occurrence output from at least one of the plurality of communication blocks and the data processing block, and outputs the identifier of a network for which the determination was done and a result of the determination for the network corresponding to the identifier, wherein the interrupt controlling block is configured such that, based on the result of the determination, if the result of the determination is that traffic inbound from the network for which the determination was done is in over-traffic state, the interrupt controlling block shuts off the interrupt request signal to the data processing block, and if the result of the determination is that traffic inbound from the network for which the determination was done is in normal traffic state, the interrupt controlling block outputs the interrupt request signal to the data processing block.

A further aspect of the invention resides in an information processing system comprising a plurality of information processors which take control over a plurality of pieces of control equipment, respectively, and are assigned unique identifiers, a network, and a concentrator connected to the plurality of information processors, the concentrator comprising a plurality of I/O ports connecting with the network and the plurality of information processors and for transmitting and receiving packets; a storage in which a destination management table is stored, wherein the destination management table has mapping between the identifiers assigned to the plurality of information processors and the identifiers of the plurality of I/O ports corresponding to the identifiers; a communication control block which identifies, from the destination identifier specified in a packet received from one of the plurality of I/O ports, the identifier of the corresponding I/O port based on the destination management table, and transfers the received packet to the identified I/O port; and a communication monitoring block which determines whether the peer of each of the I/O ports to which packets are transmitted is in over-traffic state or normal traffic state. The communication control block is configured to, when a packet is received, output packet reception information to the communication monitoring block. The communication monitoring block is configured to determine whether the peer of each of the I/O ports is in over-traffic state or normal traffic state, based on the reception information, and output a result of the determination to the communication control block. The communication control block is further configured such that, based on the result of the determination received from the communication monitoring block, if the peer of each of the I/O ports to which packets are transmitted is in over-traffic state, the communication control block discards a packet addressed to the peer or discards a packet received from the peer.

It is possible to provide an information processor in which a risk of system down and overload of communication processing are avoided even if it is placed in over-traffic state such as under a DoS attack.

DETAILED DESCRIPTION OF PREFERRED EMBODIMENTS

An information processor such as a PLC (Programmable Logic Controller) that is connected to a network such as a factory's network communicates with a host server for exchange of diversified information via the network for the main purpose of control over control equipment connected to it.

When the present invention is used, even in case that a DoS attack affects the network to which the information processor is connected, the information processor is able to continue to do control over the control equipment, though communication with the host server is restricted.

In the following, illustrative embodiments of the invention will be described by means of the drawings.

First Embodiment

Figure 1:
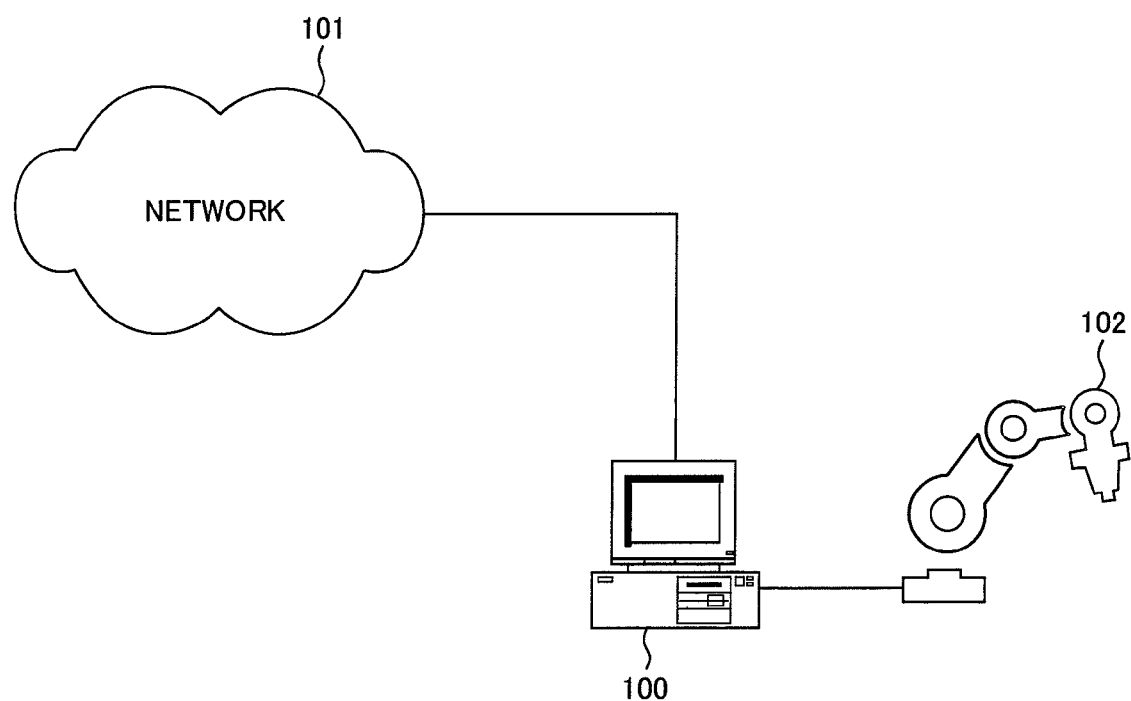
FIG. 1 shows a framework of a system to which an embodiment of the present invention is applied.

FIG. 1 shows an example of a framework of a system employing an information processor to which the present invention is applied.

An information processor 100 is connected with a network 101 to take control and monitoring over the control equipment 102.

The information processor 100 monitors the control equipment 102 and transmits information about activity of the control equipment 102 to a predetermined destination through the network 101.

Besides, the information processor 100 controls the control equipment 102, based on information transmitted from a predetermined source through the network 101.

Figure 2:
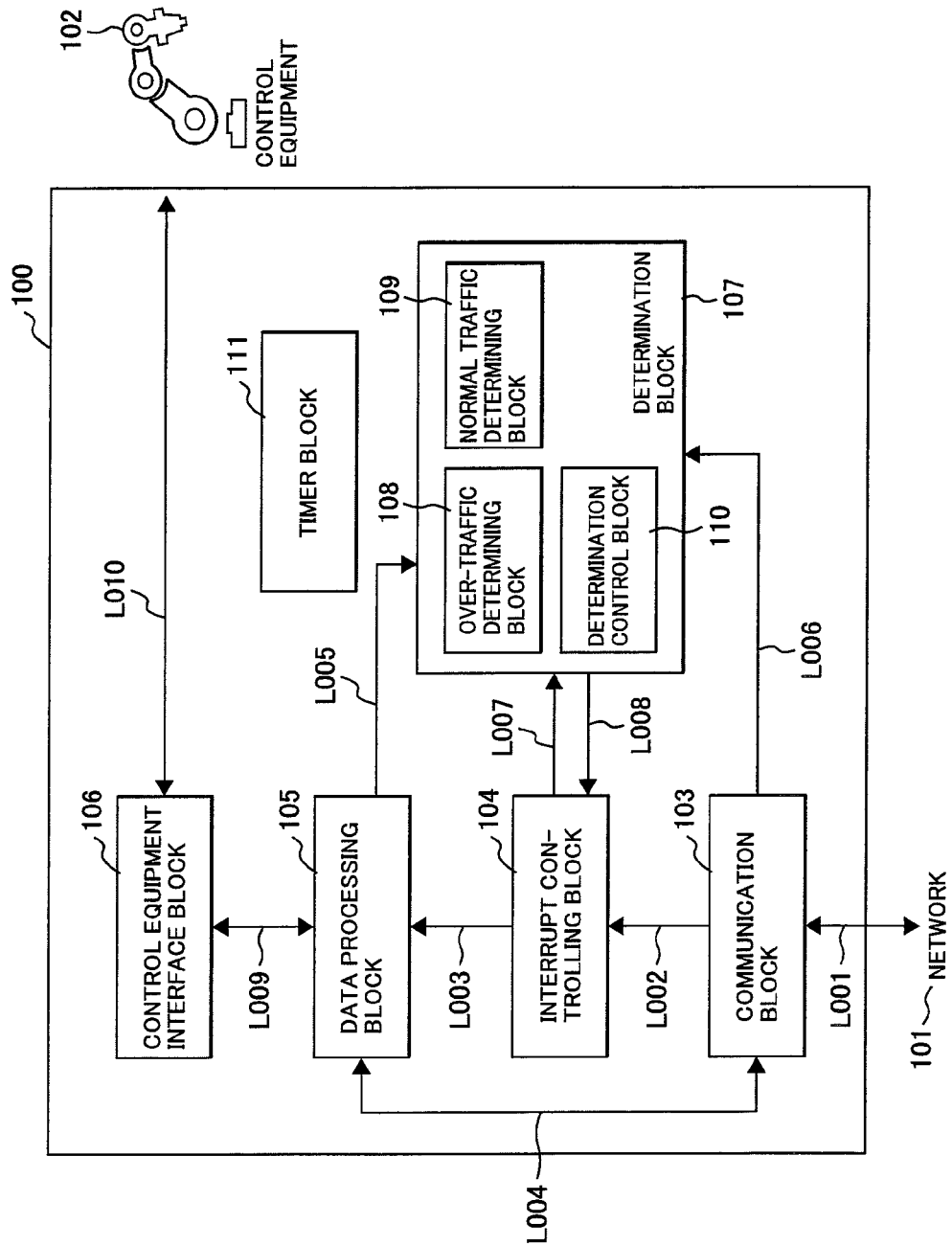
FIG. 2 shows a configuration of an information processor representing an embodiment of the present invention.

FIG. 2 shows an internal configuration of the information processor 100 of the present invention.

Arrows in the figure denote logical directions of signals on signal lines at the connections of connectors for the aid of understanding, where the signal lines simply provide electrical connections between two entities.

A communication block 103 transmits and receives packets to/from the network 101 through a signal line L001. The communication block 103 is connected with an interrupt controlling block 104 through a signal line L002 which is used for sending an interrupt request signal, connected with a data processing block 105 through a signal line L004 which is used for transferring packets, and connected with a determination block 107 through a signal line L006 which is used for transferring information about communication. An interrupt request signal sent from the communication block 103 to the interrupt controlling block 104 through the signal line L002 indicates that a normal packet has been received. The interrupt controlling block 104 is connected with the communication block 103 through the signal line L002, connected with the data processing block 105 through a signal line L003, and connected with the determination block 107 through a signals line L007 and a signal line L008. The signal line L007 and signal line L008 may be bundled into a single bus physically. The interrupt controlling block 104 controls whether to send an interrupt request signal onto the signal line L003, according to a determination made by the determination block 107, transferred to it on the signal line L008. That is, the interrupt controlling block 104 controls output of an interrupt request signal to the data processing block 105.

When the data processing block 105 receives an interrupt request signal through the signal line L003, it processes a packet received through the signal line L004. As required, based on the received packet, it generates control command data which is given to control equipment 102 and sends the control command data to a control equipment interface block 106. The data processing block 105 also processes information received from the control equipment interface block 106 according to a given method, generates a transmission packet, and transmits it to a predetermined peer.

The control equipment interface block 106 transfers a control command data generated by the data processing block 105 to the control equipment 102 through a signal line L010 and transfers information received from the control equipment 102 to the data processing block 105 through a signal line L009.

The determination block 107 determines whether inbound traffic from the network 101 is under over-traffic state or normal traffic state, based on communication information transferred from at least one of the communication block 103, the interrupt controlling block 104, and the data processing block 105. The determination block 107 sends a result of the determination to the interrupt controlling block 104.

The determination block 107 includes an over-traffic determining block 108 which determines whether inbound traffic from the network 101 is under over-traffic state, based on the communication information, a normal traffic determining block 109 which determines whether inbound traffic from the network 101 is under normal traffic state, based on the communication information, and a determination control block 110 which outputs a traffic state determination carried out by the determination block 107, based on results of the determinations made by the over-traffic determining block 108 and the normal traffic determining block 109.

Figure 3:
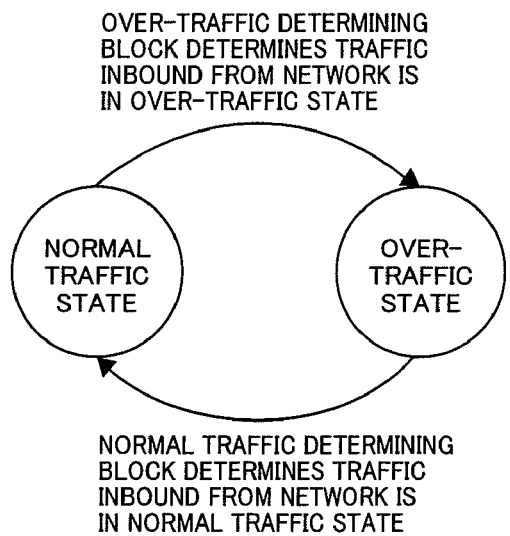
FIG. 3 shows a state transition diagram as to determining a traffic state according to an embodiment of the present invention.

As an example of a method of determination by the determination control block 110, a state transition diagram is provided as shown in FIG. 3.

Normal traffic state and over-traffic state shown in this diagram correspond to results of determination output by the determination control block 110, that is, results of determination made by the determination block 107. Under circumstances where normal traffic state has been determined until now, when the over-traffic determining block 108 determines that inbound traffic from the network is in over-traffic state, transition from normal traffic state to over-traffic state occurs. Similarly, under circumstances where over-traffic state has been determined until now, when the normal traffic determining block 109 determines that inbound traffic from the network is in normal state, transition from over-traffic state to normal traffic occurs.

A timer block 111 has a timer means and sends time information to the interrupt controlling block 104, the data processing block 105, and the determination block 107 (paths for sending time information are not shown).

Figure 4:
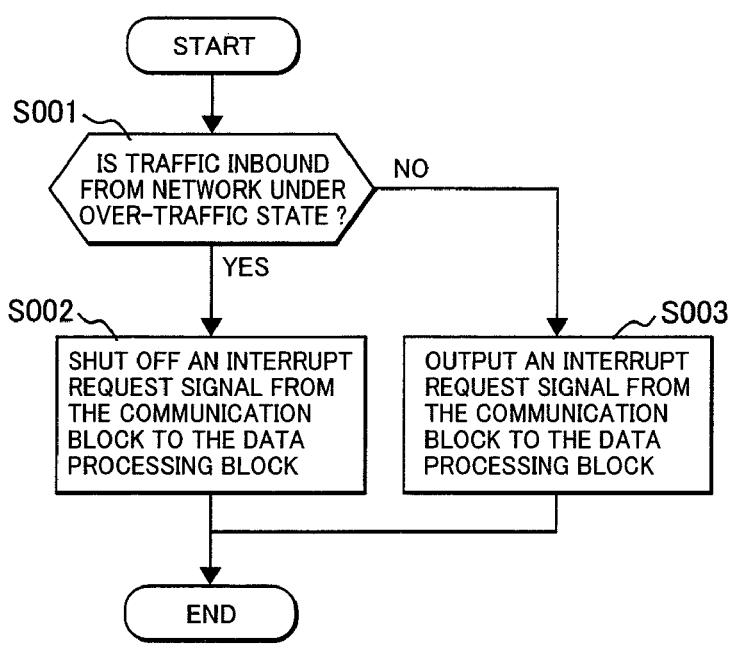
FIG. 4 illustrates a control flow according to an embodiment of the present invention.

FIG. 4 illustrates an example of a control flow by the interrupt controlling block 104.

The interrupt controlling block 104 determines whether inbound traffic from the network 101 is under over-traffic state, based on the result of determination received from the determination block 107 at given intervals (S001). When determining that it is under over-traffic state, the interrupt controlling block 104 does not output an interrupt request signal received from the communication block 103 to the data processing block 105 (S002). Conversely, when determining that it is not under over-traffic state, i.e., it is under normal traffic state, the interrupt controlling block 104, upon receiving an interrupt request signal from the communication block 103, outputs the interrupt request signal to the data processing block 105 (S003). An evaluation index used in making a determination by the determination block 107 may be selected from several options: e.g., "a total of time spent for processing received packets" for a predetermined interval; "frequency of interrupt occurrence due to packet reception" for a predetermined interval; "receiving a packet having a special format (herein after referred to as a special packet)" which is predefined to indicate a traffic state of the network 101; and a combination thereof.

In the following, each option that can be taken as the evaluation index will be explained in detail.

(1) Here, a case where "a total of time spent for processing received packets" is used as the index of evaluation is described.

When the data processing block 105 receives an interrupt request from the interrupt controlling block 104, it gets a received packet from the communication block 103 through the signal line L004 and processes the received packet. The determination block 107 obtains time spent for processing a received packet in the data processing block 105 or a ratio of received packet processing time to a predetermined unit time from the data processing block 105, for every predetermined interval. The data processing block 105 may transfer this time spent for the processing and its ratio to the determination block 107. Alternatively, the determination block 107 may acquire these information from the data processing block 105 by any method.

The data processing block 105 acquires time information at the start and the end of processing a received packet from the timer block 111. By calculating a difference between the start time and the end time, time spent for processing the received packet can be calculated.

Within the predetermined interval, time spent for processing each received packet is summed up and a total of time spent for processing received packets is obtained.

The over-traffic determining block 108 compares the total of time spent for processing received packets or the ratio of received packet processing time to the predetermined unit time, which have been received as above, to a predetermined threshold value. When the evaluation index such as the total of time spent for the processing or the ratio of received packet processing time to the unit time is equal to or greater than the predetermined threshold value, it is determined that inbound traffic from the network is in over-traffic state.

The determination control block 110 acquires a determination status from the over-traffic determining block 108 at given intervals under circumstances where the traffic state has been in normal traffic state until now. When the over-traffic determining block 108 determines that the network becomes over-traffic state, the determination block 107 sends a traffic state signal indicating that inbound traffic from the network 101 is in over-traffic state, to the interrupt controlling block 104. The determination block 107 does no action when the over-traffic determining block 108 determines the traffic state as being under normal traffic state.

Under over-traffic state, the data processing block 105 does not process received packets, therefore, no determination is made as to which state of traffic inbound from the network 101 according to time spent for processing received packets.

The above threshold value may be determined, for example, by empirical method through a communication load test or by calculating method using both an assumed traffic state and the performance of the information processor.

The threshold value may be changed dynamically during operation without being fixed. For example, it may be set arbitrarily by the data processing block 105 or set in relation to variation in inbound traffic state. In this way, a threshold value can be set adaptively to an environment in which the present invention is carried out.

(2) Here, a case where "frequency of interrupt occurrence due to packet reception" is used as the evaluation index is described.

When the communication block 103 receives a packet from the network 101, it sends an interrupt request to the interrupt controlling block 104 through the signal line L002. The communication block 103 and the interrupt controlling block 104 count the frequency of this interrupt occurrence and transfer the count value to the determination block 107.

The determination block 107 compares the frequency (count value) of interrupt occurrence due to packet reception, acquired as above for a predetermined interval, to a predetermined threshold value. When the above frequency of interrupt occurrence due to packet reception is equal to or greater than the predetermined threshold value, the determination block 107 sends a traffic state signal indicating that inbound traffic from the network is under over-traffic state to the interrupt controlling block 104. When not so, the determination block 107 sends a signal indicating that inbound traffic from the network is under normal traffic state to the interrupt controlling block 104.

The above threshold value may be determined in the same way as described for the case where a total of time spent for processing received packets is used as the evaluation index.

(3) Here, a case where "receiving a special packet" is used as the evaluation index is described.

In a system including the information processor 100 of the present invention, a special packet that may indicate either over-traffic state or normal traffic state is defined beforehand. When the communication block 103 receives a packet from the network 101, it checks if it is a special packet. Likewise, when the data processing block 105 receives an interrupt request indicating that a packet has been received from the interrupt controlling block 104 through the signal line L003, it gets the packet from the communication block 103 and checks if it is a special packet. When it is a special packet, the communication block 103 and the data processing block 105 transfer the content of the special packet to the determination block 107.

When the content of the above special packet indicates over-traffic state of the network 101, the over-traffic determining block 108 determines that inbound traffic from the network is in over-traffic state. When the content of the above special packet indicates normal traffic state of the network 101, the normal traffic determining block 109 determines that inbound traffic from the network is in normal traffic state. The determination control block 110 determines the current traffic state, as exemplified by the state transition diagram shown in FIG. 3. The determination block 107 sends a result of the determination made by the determination control block 110 to the interrupt controlling block 104 at given intervals.

Figure 5:
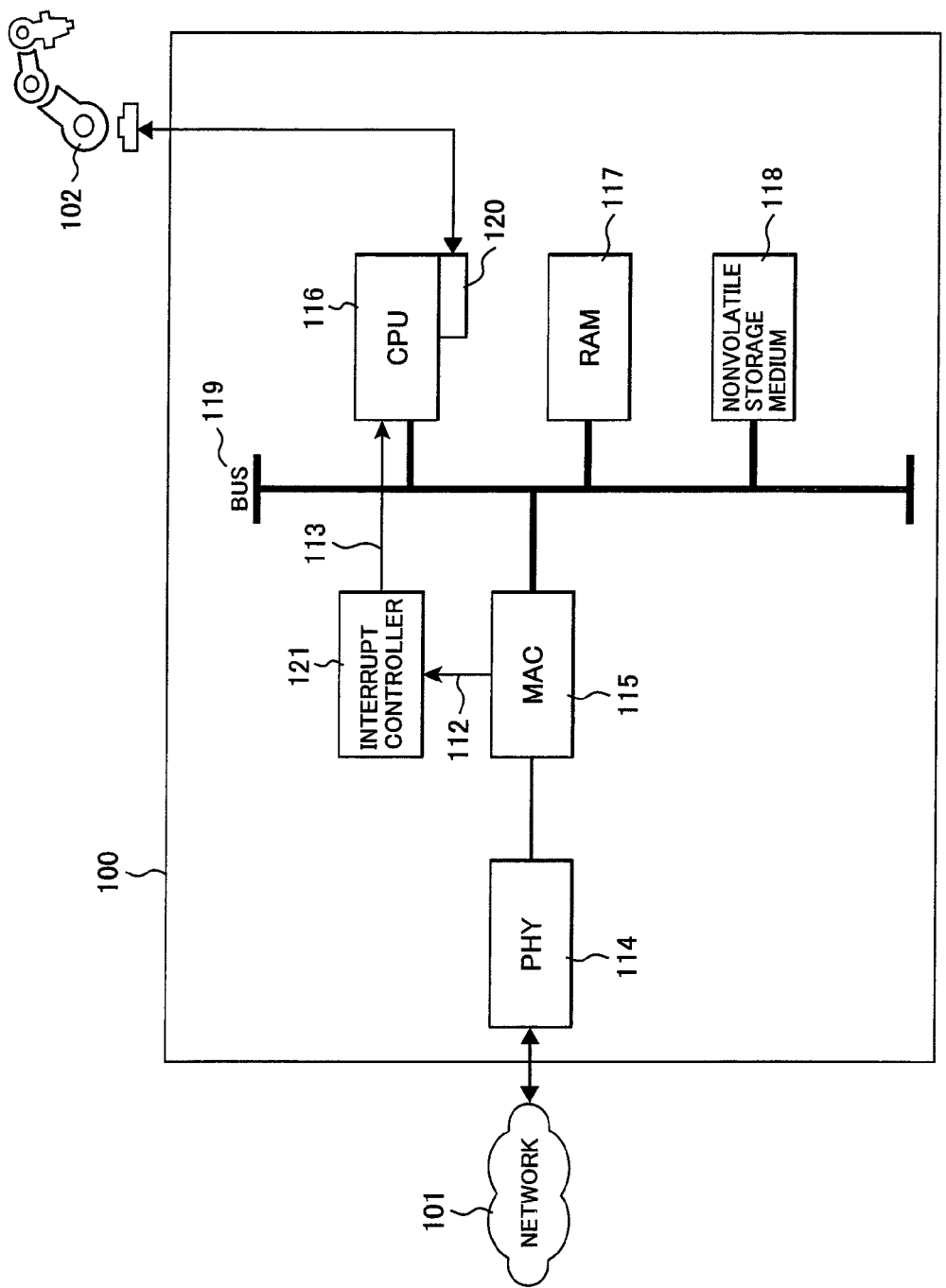
FIG. 5 shows a hardware configuration representing an embodiment of the present invention.

FIG. 5 shows an embodiment of hardware implementation of the present invention implemented in an information processor having an Ethernet™ interface. As the communication interface to the network 101, an alternative interface such as IEEE 1394, USB, or serial bus may be applied optionally.

PHY 114 is an transceiver IC provided with communication functions at a physical layer. MAC 115 is an example of an Ethernet™ control IC.

The PHY 114 and the MAC 115 are connected to each other by interface specification that is called IEEE 802.3u standard Media Independent Interface (herein after referred to MII) or IEEE 802.3z standard Gigabit Media Independent Interface (herein after referred to as GMII).

The PHY 114 has a function to generate a transmission signal suitable for the communication medium of the network 101 to which the information processor is connected and communicates with the network 101 and the MAC 115.

The PHY 114 and the MAC 115 correspond to the communication block 103 in FIG. 2.

An IC into which the PHY 114 and the MAC 115 are combined may also be used without losing the benefit of the present invention.

The MAC 115 communicates with other devices connected to a bus 119 while having the connection to the PHY 114. Besides, a signal line for interrupt input 112, which is used for MAC 115 to send the interrupt request, is connected to an interrupt controller 121.

The interrupt controller 121 is connected to the MAC 115 via the signal line of interrupt input 112 and connected to the CPU 116 via a signal line of interrupt output 113. The interrupt controller 121 corresponds to the interrupt controlling block 104 and the determination block 107 in FIG. 2.

While the CPU 116 is connected to the interrupt controller 121 via the signal line of interrupt output 113, it is connected to the bus 119 to transfer a program from an nonvolatile memory (storage medium) 118 to a RAM 117 and execute the program. The executable programs include, but not limited to, an operating system (hereinafter referred to as OS), programs for communication with the network 101, and programs for taking control over the control equipment 102. The CPU 116 corresponds to the data processing block 105 in FIG. 2.

The nonvolatile memory 118 is an information storing medium and is used to store programs for operating the CPU 116, results of program execution, and information about the activity of the control equipment 102.

The RAM 117 is a temporary storage area used for the CPU 116 to operate, and it stores the OS and an application program being transferred from the nonvolatile memory 118 and information during a carrying-out task is operating.

A serial interface 120 sends a control command from the CPU 116 to the control equipment 102 and receives activity information or the like from the control equipment 102 and passes it to the CPU 116.

The control equipment 102 receives a control command from the CPU 116 via a serial interface 120 as an interface module and operates according to the control command. As results of operation of the control equipment 102, activity information from the control equipment is sent to the CPU 116 via the serial interface 120.

The bus 119 interconnects the MAC 115, CPU 116, RAM 117, and nonvolatile memory 118. As the bus 119, e.g., a PCI bus, an ISA bus, or a PCI express bus may be used.

Figure 6:
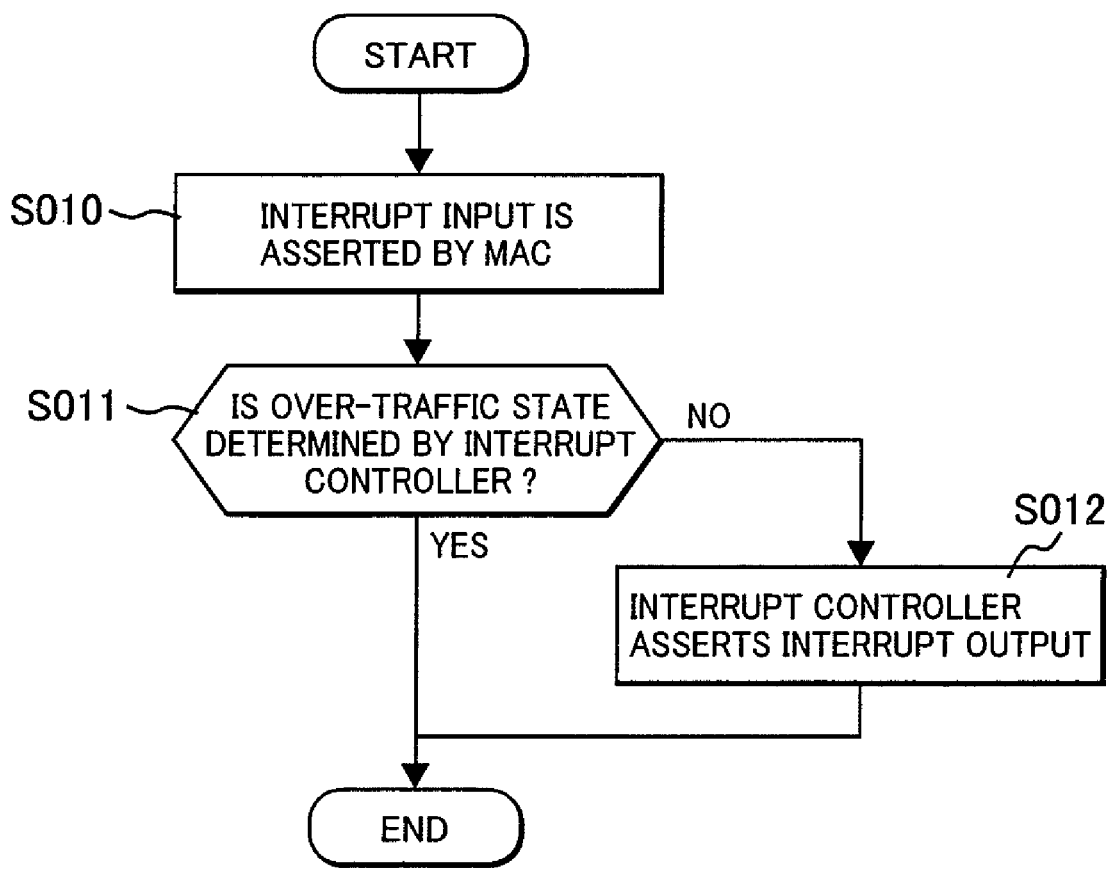
FIG. 6 illustrates a control flow according to an embodiment of the present invention.

FIG. 6 illustrates an example of a control flow by the interrupt controller 121.

When the MAC receives a normal packet from the network 101, it asserts the interrupt input 112 (S010). At the same time, the MAC 115 transfers the received packet to the RAM 117.

Asserting means driving a signal to an active level of voltage and negating means driving a signal to an inactive level of voltage. For example, asserting a negative logic signal means driving the signal to a low level of voltage (denoted by Low or "0"). On the other hand, negating it means driving the signal to a high level of voltage (denoted by High or "1").

In some type of MAC, an interrupt caused by an event other than the packet reception may be sent through the same interrupt signal line. In that case, by reading a value held in an interrupt status register that indicates what event caused the interrupt in the MAC 115 through the bus 119, it can be identified whether the packet reception caused the interrupt.

Then, the interrupt controller 121 determines whether inbound traffic from the network 101 is in over-traffic state or normal traffic state (S011). When inbound traffic from the network 101 is in over-traffic state, as determined at S011, the interrupt controller 121 does not assert the interrupt output 113. Conversely, When inbound traffic from the network 101 is in normal traffic state, the interrupt controller 121 asserts the interrupt output 113 and sends an interrupt request to the CPU 116 (S012).

The CPU 116, upon receiving the interrupt request, reads the content of the received packet from the RAM 117 and processes it according to a given method. As the result of this receive processing, by way of example, a control command for the control equipment is generated; thereby the control equipment 102 is controlled.

The interrupt controller 121 may make the determination on the basis of "frequency of interrupt occurrence due to packet reception" for a predetermined interval or according to "notification of a traffic state from outside".

Here, a case where "frequency of interrupt occurrence due to packet reception" is used as the evaluation index is described.

When a packet is received from the network 101 via the PHY 114, an interrupt request signal is output by asserting the interrupt input 112 to the interrupt controller 121.

The number of times the interrupt input 112 has been asserted is counted and stored in an internal register (not shown) which is a storage provided in the interrupt controller 121.

The interrupt controller 121 compares the above internal register value to a predetermined threshold value for a predetermined interval. The threshold value may be set by holding its initial setting value in a nonvolatile memory provided in the interrupt controller 121 or may be set externally through a dip switch.

The interval may also be set in the same way as setting the threshold value.

The interrupt controller 121 compares the number of times the interrupt input 112 has been asserted to the above predetermined threshold value for the predetermined interval. As a result, when the number of times the interrupt input has been asserted is equal to or more than the threshold value, the interrupt controller 121 determines that inbound traffic is under over-traffic state. In this case, the interrupt controller 121 does not assert the interrupt output 113 even if the interrupt input 112 is asserted. Consequently, processing of the received packet is not executed by the CPU 116.

When the number of times the interrupt input has been asserted is less than the threshold value, the interrupt controller 121 determines that inbound traffic is under normal traffic state. When the interrupt input 112 is asserted, the interrupt controller 12 asserts the interrupt output 113 and passes the interrupt request to the CPU 116.

Figure 7:
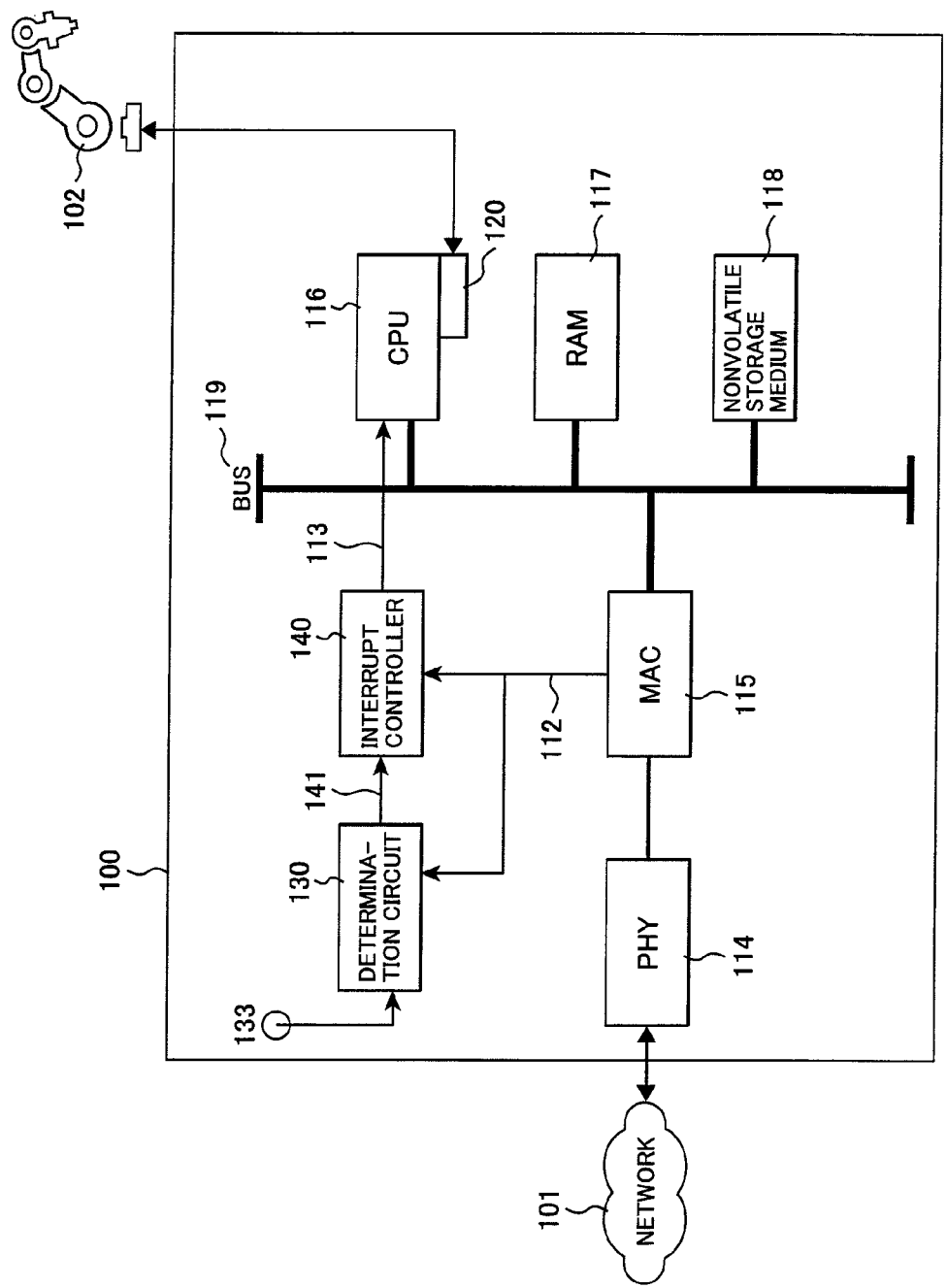
FIG. 7 shows a hardware configuration representing an embodiment of the present invention.
Figure 8:
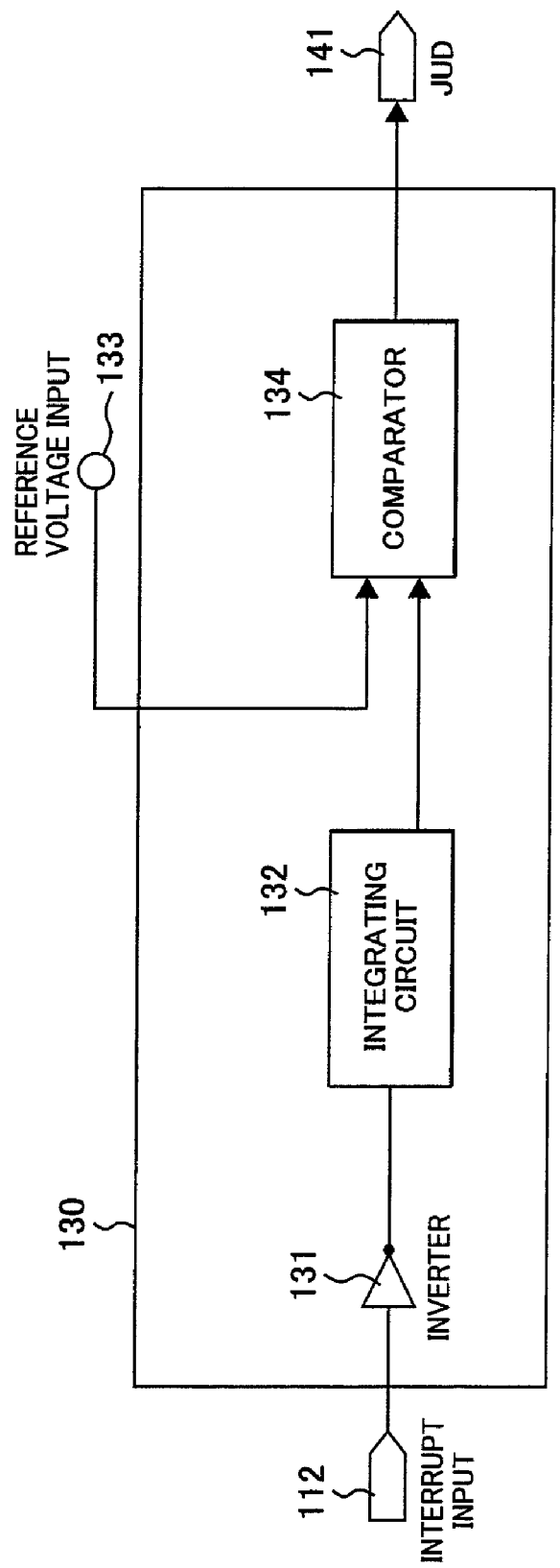
FIG. 8 shows a determination circuit based on interrupt frequency according to an embodiment of the present invention.

FIG. 7 shows a configuration example of another embodiment in which a circuit for determining the interrupt occurrence frequency is separated from the other circuits, to the embodiment of FIG. 5. An example of a configuration of the determination circuit 130 is shown in FIG. 8. It is assumed that the interrupt input 112 has a negative logic.

JUD 141 in FIG. 7 is a signal line for outputting a result of the determination by the determination circuit 130 to an interrupt controller 140.

The interrupt controller 140 determines that inbound traffic state from the network 101 is in over-traffic state when the JUD 141 is asserted, in contrast with this, it determines that inbound traffic state from the network 101 is in normal traffic state when the JUD 141 is negated.

In the determination circuit 130, the interrupt input 112 output from the MAC 115 is a negative logic and an inverter 131 has a function to invert the logic for integration in an integrating circuit. While the interrupt input 112 is asserted, the integrating circuit 132 integrates input voltage values of the interrupt input 112. Therefore, an amount of charge in proportion to time during which the interrupt input 112 is asserted is stored. The charge stored in the integrating circuit 132 is cleared to 0 periodically.

A comparator 134 compares an output value of the integrating circuit 132 to a reference voltage input 133. The reference voltage input 133 has a voltage value used as a threshold value for determining the inbound traffic state from the network 101. When the output value of the integrating circuit 132 is larger than the reference voltage input 133, the JUD 141 is asserted. When not so, the JUD 141 is negated.

Thus, the JUD 141 is asserted when it is determined that traffic inbound from the network 101 is under over-traffic state.

When the JUD 141 is asserted, the interrupt controller 140 does not assert the interrupt output 113 even if the interrupt input 112 is asserted. Therefore, processing for the received packet is not executed by the CPU 116.

JUD 141 is negated when it is determined that traffic inbound from the network 101 is under normal traffic state. When JUD 141 is negated, the interrupt controller 140 determines that the inbound traffic is under normal traffic state, and passes the interrupt request to the CPU 116 through the interrupt output 113 when the interrupt input 112 is asserted.

In this embodiment, the determination circuit 130 corresponds to the determination block 107 in FIG. 2 and the interrupt controller 140 corresponds to the interrupt controlling block 104 in FIG. 2.

Here, a case where "notification of a traffic state from outside" is performed is described.

Figure 9:
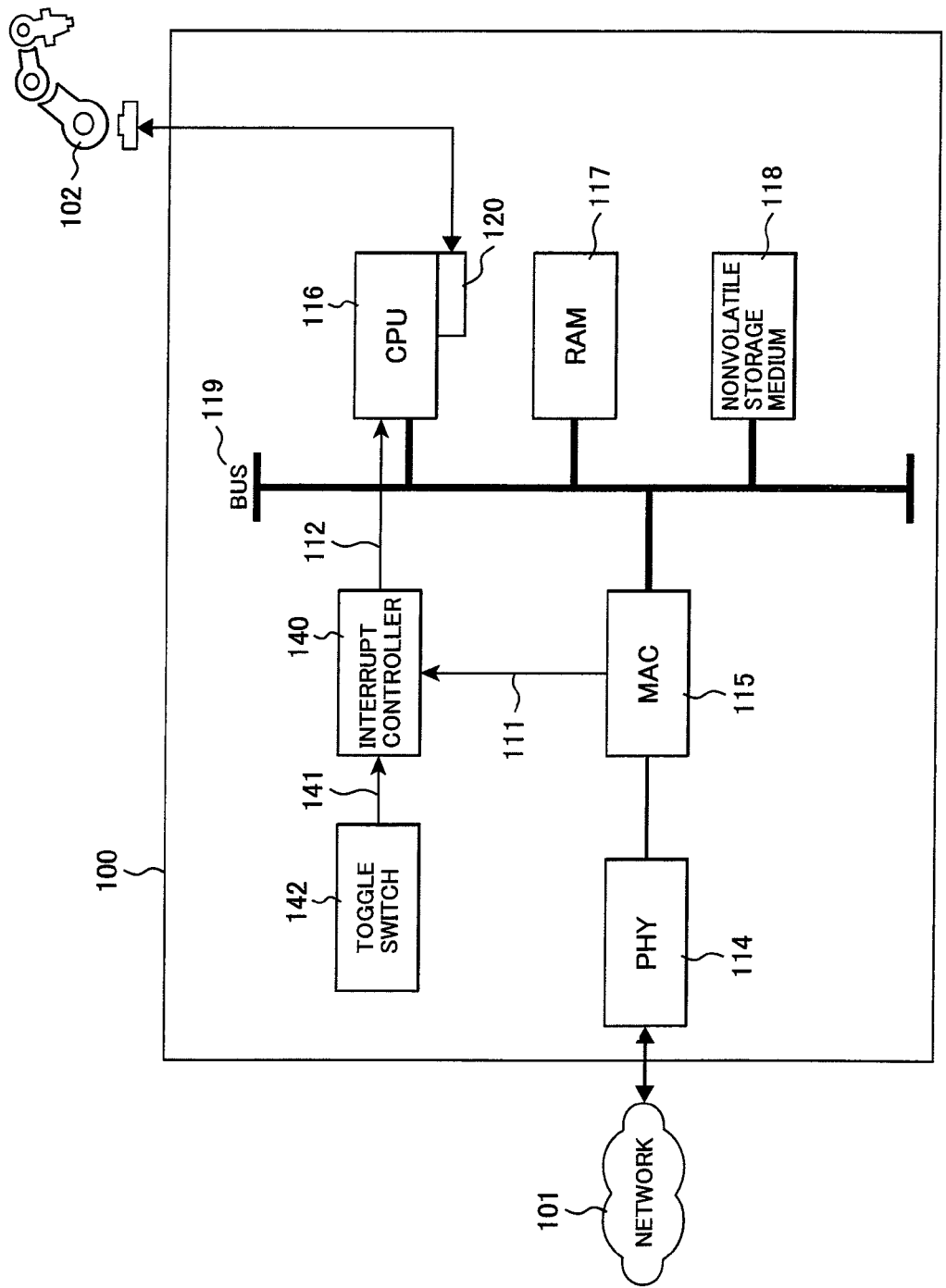
FIG. 9 shows a hardware configuration representing an embodiment of the present invention.

FIG. 9 shows a configuration example where the interrupt controller 140 shown in FIG. 7 is used.

JUD 141 in FIG. 9 is a signal line for outputting a result of determination by a toggle switch 142 to the interrupt controller 140.

In the configuration of FIG. 9, when the toggle switch 142 is turned on, JUD 141 is asserted, and the interrupt controller 140 determines that the inbound traffic from the network 101 is in over-traffic state. When the toggle switch 142 is turned off, JUD 141 is negated, and the interrupt controller 140 determines that the inbound traffic from the network 101 is in normal traffic state. In this embodiment, the toggle switch 142 corresponds to the determination block 107 in FIG. 2.

Figure 10:
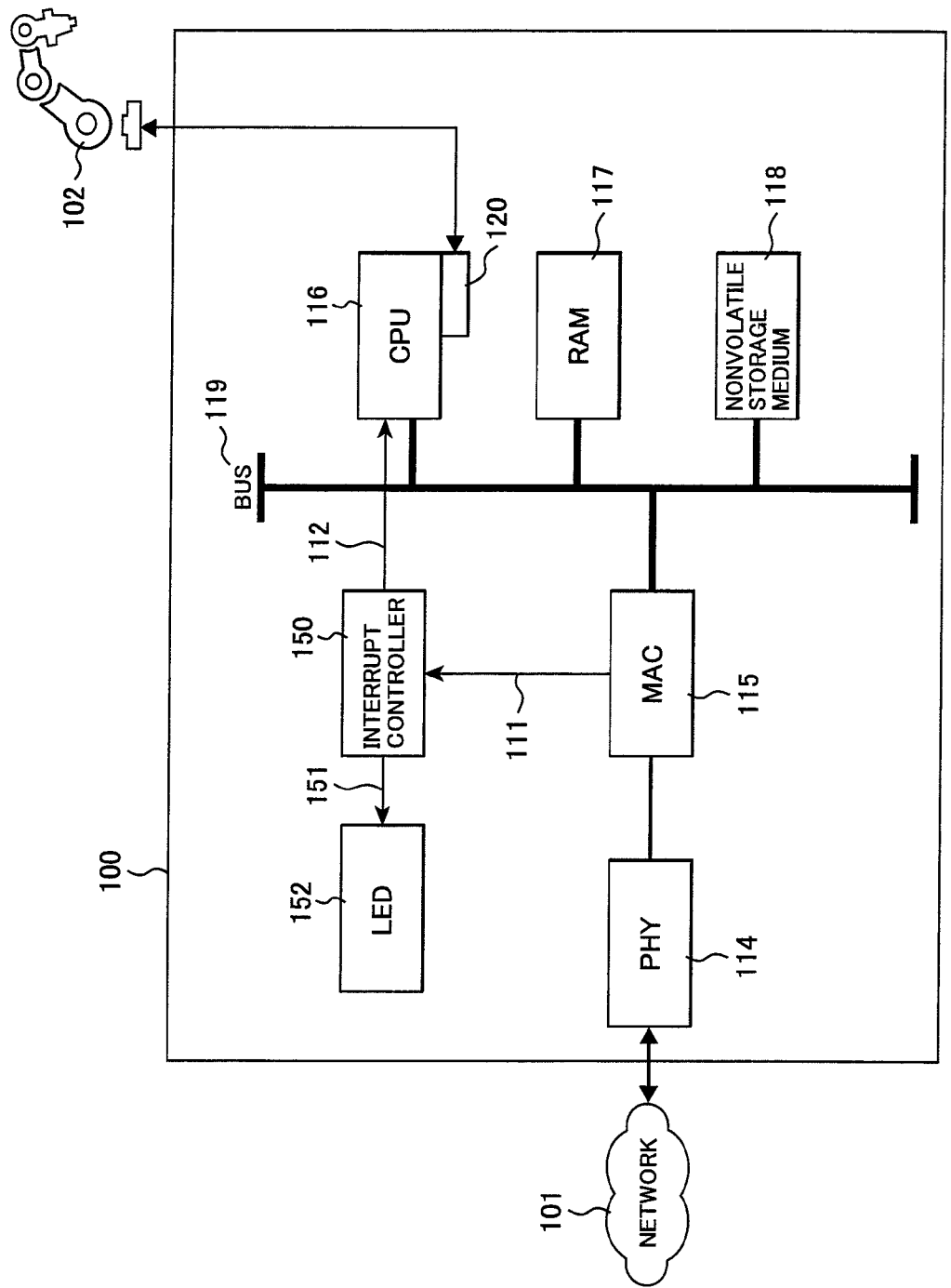
FIG. 10 shows a hardware configuration representing an embodiment of the present invention.

FIG. 10 shows a configuration example where an interrupt controller 150 adapted to output the current determined state to outside is used. By provision of an indicator to indicate the inbound traffic state from the network, this configuration has an advantageous effect that a supervisor or the operator of the information processor can visually perceive the inbound traffic state from the network. In this embodiment, an LED (light Emitting Diode) is used as the indicator.

STS 151 is a signal line for outputting the current traffic state determined by an interrupt controller 150 to the LED 152.

The interrupt controller 150 corresponds to the interrupt controlling block 104 and the determination block 107 in FIG. 2.

The STS 151 that is output from the interrupt controller 150 is asserted when it is determined that inbound traffic is in over-traffic state. Therefore, the LED 152 goes on/off in accordance with the signal level of the STS 151 by connecting the interrupt controller 150 and the LED 152 as shown in FIG. 10. That is, by the indicator, a result of the determination made by the interrupt controller 150 can be visually indicated to the supervisor or operator outside of the information processor. For example, when the STS 151 has a positive logic, the LED 152 goes on when the interrupt controller 150 determines that inbound traffic from the network is in over-traffic state.

By the above disclosed method in which the invention is implemented, the information processor 100 to which the present invention is applied stops receive processing under the state of abnormal traffic inbound from the network 101 due to a DoS attack or a great deal of access. In consequence, the information processor can perform control over the control equipment connected to it without being occupied with processing for communication. The information processor 100 can restart receive processing automatically upon the termination of the above over-traffic state.

Second Embodiment

Figure 11:
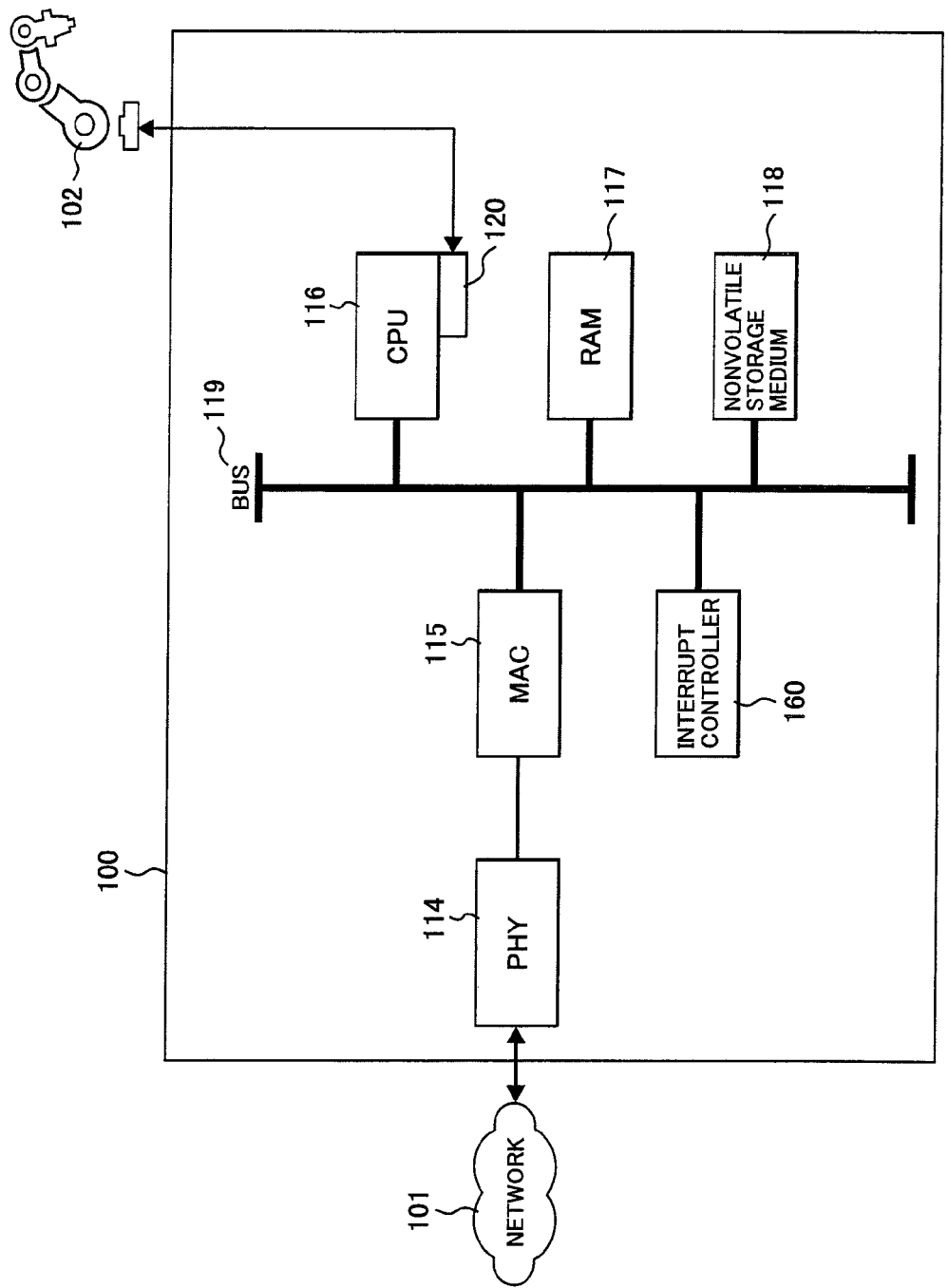
FIG. 11 shows a hardware configuration representing an embodiment of the present invention.

FIG. 11 shows another embodiment of hardware implementation of the present invention implemented in an information processor having an Ethernet™ interface. An example of a system framework in which the present embodiment is used is the same as shown in FIG. 1.

Reference numerals used in the second embodiment is the same as those of the corresponding functions, components, and the like described in the first embodiment, unless otherwise noted.

In the second embodiment, difference from the configuration of FIG. 5 lies in that an interrupt controller 160 is connected to the bus 119. An interrupt request from the MAC 115 is set to be sent to the interrupt controller 160. The interrupt controller 160 corresponds to the interrupt controlling block 104 and the determination block 107 in FIG. 2. A control flow by the interrupt controller 160 is the same as illustrated in FIG. 6.

An evaluation index used for the interrupt controller 160 to determine may be selected from several options: e.g., "a total of time spent for processing received packets" for a predetermined interval; "frequency of interrupt occurrence due to packet reception" for a predetermined interval; "receiving a special packet" predefined to indicate a traffic state of the network 101; and a combination thereof.

Here, each option that can be taken as the evaluation index will be explained in detail.

First, a case where "a total of time spent for processing received packets" is used as the evaluation index is discussed.

Under normal traffic state, the OS running on the CPU 116 processes received packets. Thus, the interrupt controller 160 obtains a total of time spent for processing received packets for a predetermined interval or a ratio of received packet processing time to a predetermined unit time, from the OS running on the CPU 116.

Figure 12:
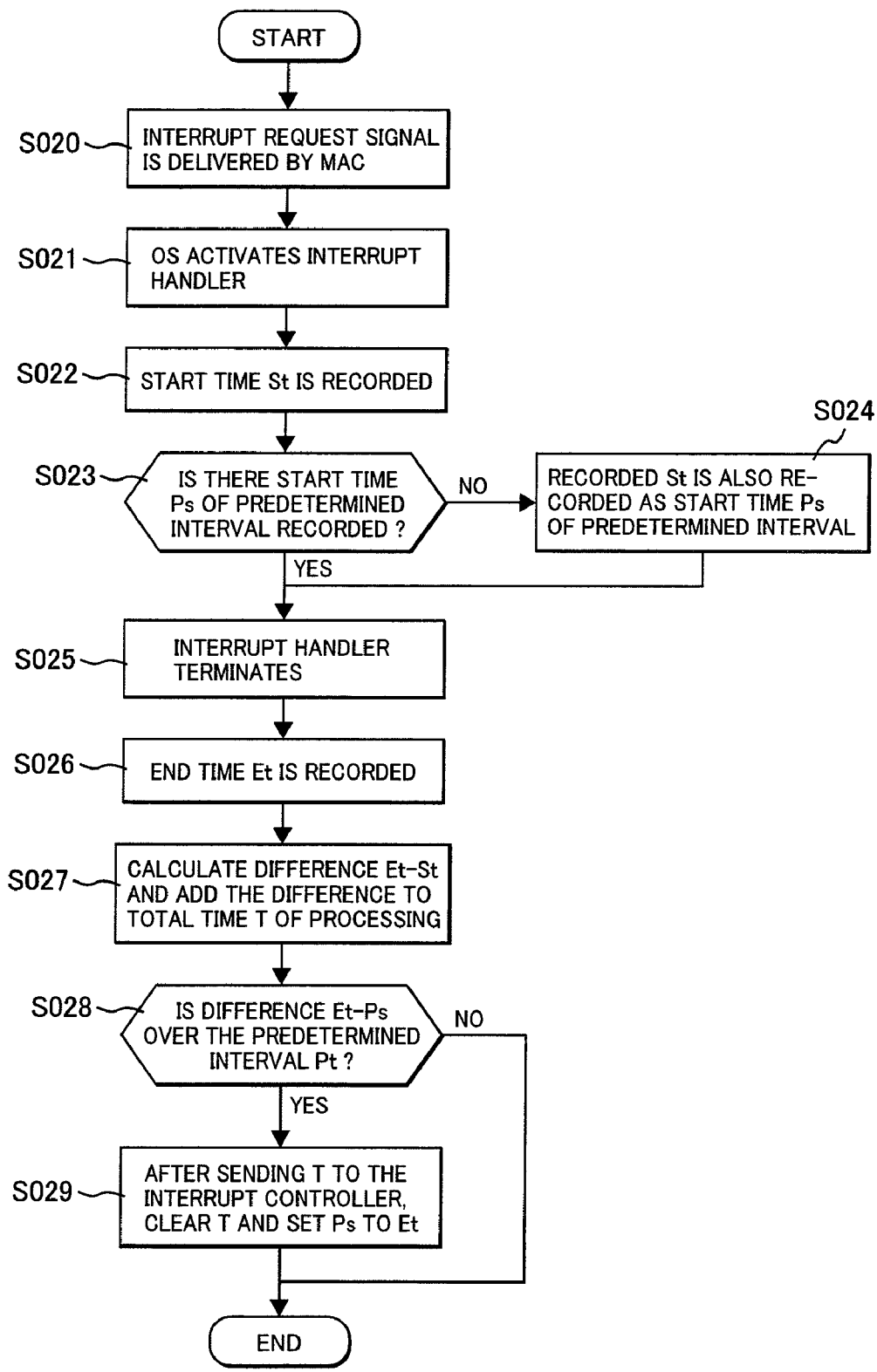
FIG. 12 illustrates a method for measuring time spent for processing according to an embodiment of the present invention.

A method for measuring a total of time spent for the above receive processing is illustrated in FIG. 12.

A received packet is transferred from the MAC 115 to the RAM 117, the MAC 115 sends an interrupt request to the interrupt controller 160, and the interrupt controller 160, upon receiving the interrupt request, passes the interrupt request to the CPU 116 (S020). By this interrupt request, the OS activates an interrupt handler and the received packet is processed (S021). The start time St of the interrupt handler is recorded (S022). Time can be obtained by reading a counter value of an internal timer of the CPU and multiplying the counter value by a reciprocal number of a clock frequency or by using a time acquisition function provided by the OS.

Then, it is determined whether the start time Ps of a predetermined interval is recorded (S023). When Ps is not recorded, Ps is set equal to St (S024). When Ps is recorded, wait until the interrupt handler terminates (S025). The end time Et of the interrupt handler is recorded (S026). After calculating a time difference (Et−St) between the start time and the end time of the interrupt handler, the difference is added to the total time T of processing (S027).

Difference (Et−Ps) between the end time of the interrupt handler and the start time of the predetermined interval is calculated and it is determined whether the difference is over the predetermined interval Pt (S028). If Et−Ps is equal to or over Pt, the total time T of processing until now is sent to the interrupt controller 160, T is cleared, and, at the same time, Ps is set to Et (S029).

The interrupt controller 160, under normal traffic state, compares the above total time spent for processing the received packets for the predetermined interval or the ratio of received packet processing time to the unit time to a predetermined threshold value. When the above measurement value used as the evaluation index is equal to or greater than the threshold value, the interrupt controller 160 determines that traffic inbound from the network 101 is under over-traffic state.

Under the over-traffic state, the OS does not process received packets and, therefore, no determination is made as to which state of traffic inbound from the network 101 according to time spent for processing received packets. In an alternative manner, the OS running on the CPU 116 may determine the state of traffic. In this manner, the OS corresponds to the over-traffic determining block 108 in FIG. 2 and the interrupt controller 160 corresponds to the determination control block 110. This manner is such that the OS holds the above threshold value and determines that inbound traffic is under over-traffic state, when the total time spent for processing received packets or the ratio of received packet processing time to the unit time is equal to or over the predetermined threshold value.

Here, a case where "frequency of interrupt occurrence due to packet reception" is used as the evaluation index is discussed.

Upon receiving a packet, the MAC 115 sends an interrupt request to the interrupt controller 160 through the bus 119. The number of times an interrupt signal line on the bus 119 has been asserted is counted and stored in an internal register of the interrupt controller 160.

The interrupt controller 160 compares the value of the above internal register to a predetermined threshold value at the end of a predetermined interval. The threshold value and the interval may be set in the same manner as described for the interrupt controller 121 in the first embodiment.

As a result of the comparison between the number of times the interrupt signal line has been asserted and the above threshold value, when the number of times the line has been asserted is equal to or more than the threshold value, the interrupt controller 160 determines that inbound traffic is under over-traffic state. When the number of times the line has been asserted is less than the threshold value, the interrupt controller 160 determines that inbound traffic is under normal traffic state. The interrupt controller 160 clears the number of times the interrupt signal line has been asserted, stored in the internal register, periodically.

It is also possible to make the determination by using the determination circuit 130 of FIG. 8.

Here, a case where "receiving a special packet" is used as the evaluation index is described.

In a system including the information processor to which the present invention is applied, a special packet that may indicate either over-traffic state or normal traffic state is defined beforehand. When the OS (not shown) running on the CPU 116 recognizes the reception of the above special packet, the OS identifies and sends its content to the interrupt controller 160.

Figure 13:
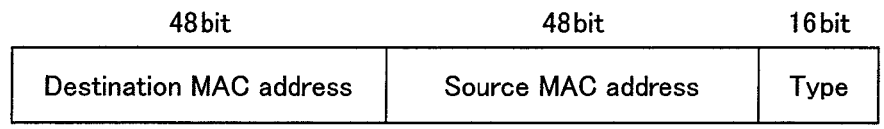
FIG. 13 shows an Ethernet™ header used for the present invention.

As the above special packet, an Ethernet™ frame including a Type field in the Ethernet™ header, which is shown in FIG. 13, may be available. This Type field is used to specify a protocol layer higher than a physical layer of the OSI (Open Systems Interconnection) reference model. Using two reserved values in the Type field, a traffic state can be designated by assigning each number to over-traffic state and normal traffic state.

Figure 14:
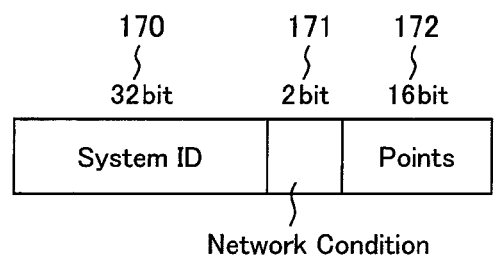
FIG. 14 shows a special packet according to an embodiment of the present invention.

At an application layer of the OSI reference model, it is possible to define a format for specifying over-traffic state and normal traffic state. An example of this format is shown in FIG. 14.

System ID 170 denotes an identifier of the source (host) of a packet within a system.

Network Condition 171 denotes a traffic state of the network 101, which, for example, can be defined as follows: a binary number of 00 represents normal traffic state and a binary number of 01 represents over-traffic state.

Points 172 indicates a degree of the traffic state designated in Network Condition 171.

For example, when a total of time spent for processing received packets is used as the basis of determination, the total time value can be applied to Points 172.

When the OS running on the CPU 116 recognizes the reception of a special packet as shown in FIG. 14, the OS parses its content and performs evaluation.

At this time, the inbound traffic state from the network 101 may be determined, for example, in the following way: different priority levels are assigned to all possible sources of a special packet in the system and different proportionality coefficients are defined for each priority level; upon receiving a special packet, the value of Points 172 is multiplied by a proportionality coefficient defined for the source of the packet; the thus obtained product is accumulated each time another special packet is received; and the cumulative sum is compared to a predetermined threshold value.

Figure 15:
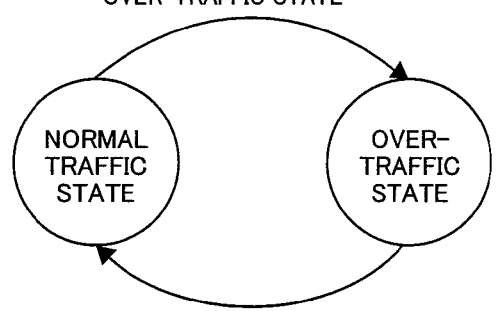
FIG. 15 shows a state transition diagram as to determining a traffic state according to an embodiment of the present invention.
Figure 16:
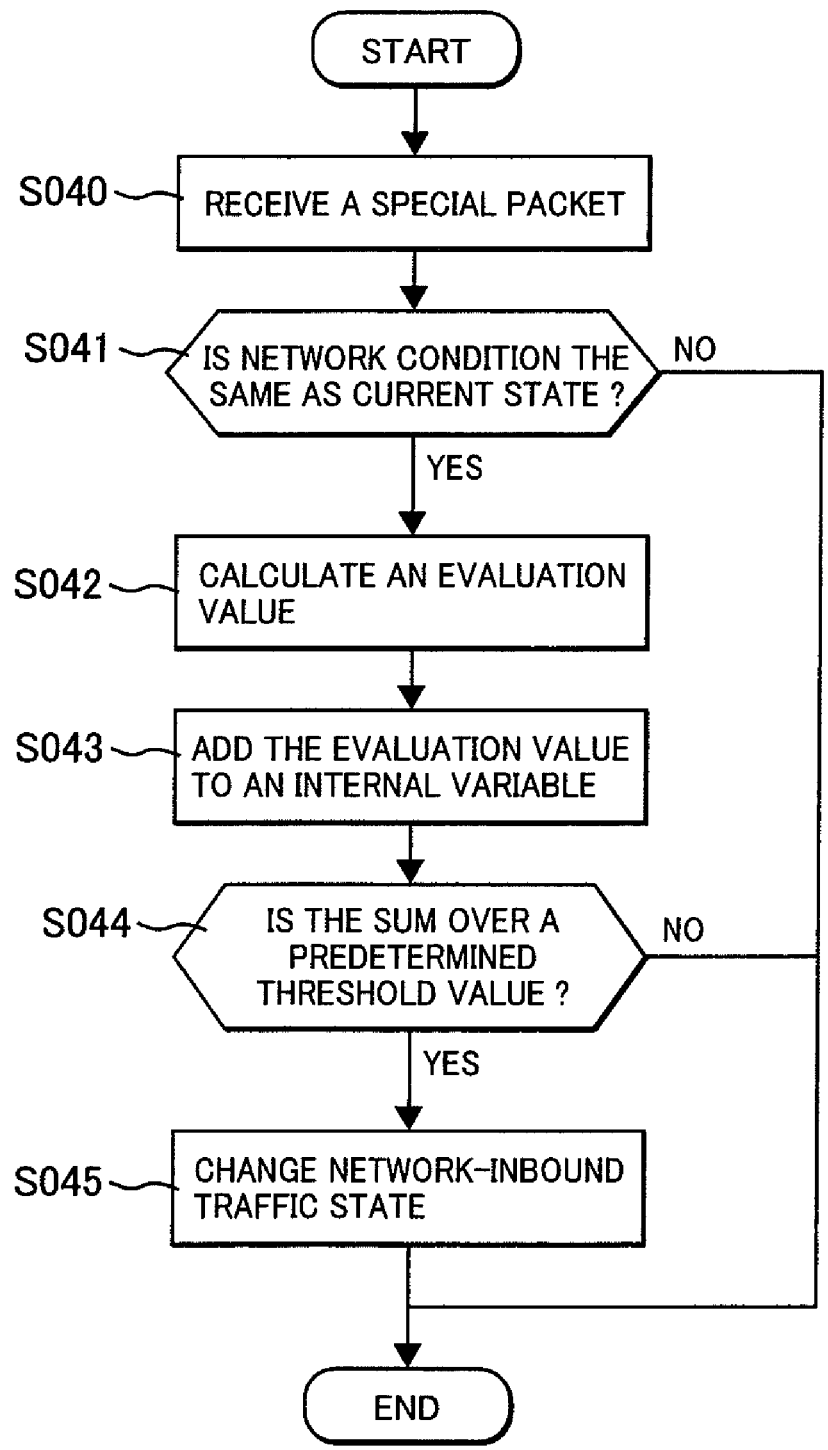
FIG. 16 illustrates a traffic state evaluation method utilizing a special packet, which represents an embodiment of the present invention.

Here, FIG. 15 shows a state transition diagram according to the traffic state determination by the interrupt controller 160 that corresponds to the determination control block 110 in FIG. 2. FIG. 16 illustrates an evaluation method that is used to determine a state transition.

First, a special packet is received (S040). It is determined whether Network Condition 171 described in the received packet is the same as the current traffic state (S041). When Network Condition 171 is the same as the current traffic state, an evaluation value is calculated by an algorithm depending on the System ID 170 (S042). By way of example, an evaluation value may be obtained, based on the value of Points 172 or based on the product of multiplication of the value of Points 172 by a proportionality coefficient predefined for each System ID 170.

Then, the calculated evaluation value is added to an internal variable (S043). The sum is compared to a predetermined threshold value (S044). When the sum is equal to or greater than the threshold value, the inbound traffic state from the network 101 is changed (S045). The cumulative sum is cleared periodically. Alternatively, the interrupt controller 160 instead of the OS may retrieve a packet from the RAM 117 upon receiving an interrupt request from the MAC 115, and, when determining it as a special packet, may parse its content and perform evaluation. In this case, by identifying the type field in the Ethernet™ header or the application-layer packet shown in FIG. 14, the interrupt controller 160 can determine if the retrieved packet is a special packet defined in the system and can determine the state of inbound traffic from the network 101 by following the procedure in FIG. 15 and FIG. 16.

It is recommended to utilize an authentication mechanism to prevent these special packets from being counterfeited by a malicious third party. As an example of the authentication mechanism, IPsec or PKI (Public Key Infra structure) may be available. Even in the event that erroneous transmission from an authenticated peer occurs, it is possible to resume receive processing in a short time by determining that inbound traffic is in the traffic state on the basis of "frequency of interrupt occurrence due to packet reception" or "notification of a traffic state from outside", unless erroneous transmission continues.

By the above disclosed method in which the invention is implemented, the information processor to which the present invention is applied stops receive processing under the state of abnormal traffic inbound from the network 101 due to a DoS attack or a great deal of access. In consequence, the information processor can perform control over the control equipment connected to it without being occupied with processing for communication. As compared with the first embodiment, the interrupt controller 160 can identify the content of a packet and exchange data with the OS running on the CPU 161. Therefore, it is possible to determine the inbound traffic state from the network 101 by selecting one of diverse options that can be used as the basis of determination. In addition, the information processor can restart receive processing automatically upon the termination of over-traffic state.

Third Embodiment

Figure 17:
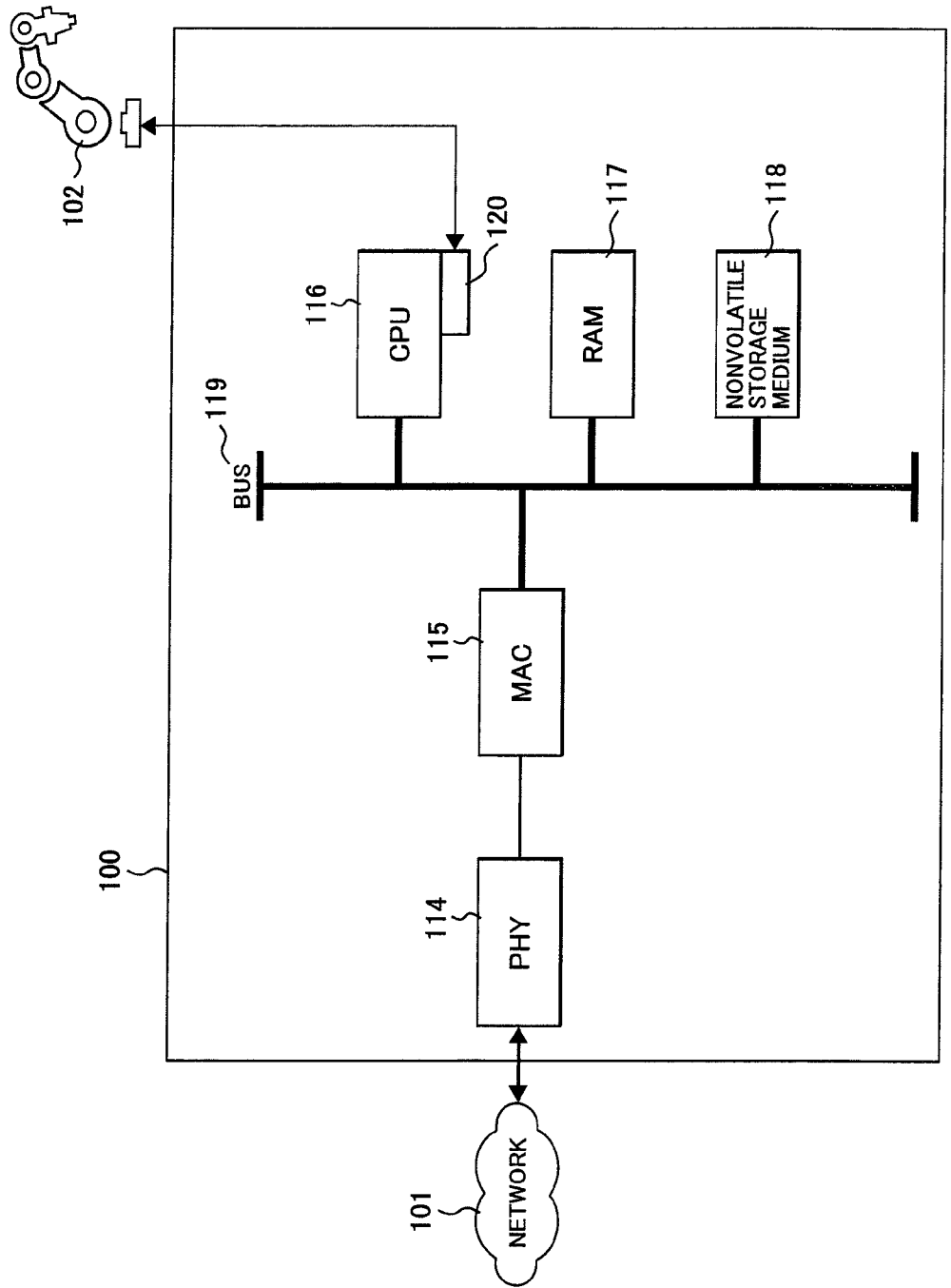
FIG. 17 shows a hardware configuration representing an embodiment of the present invention.

FIG. 17 shows an embodiment of software implementation of the present invention. An example of a system framework in which the present embodiment is used is the same as shown in FIG. 1.

Reference numerals used in the third embodiment is the same as those of the corresponding functions, components, and the like described in the first and second embodiments, unless otherwise noted.

OS running on the CPU 116 corresponds to the interrupt controlling block 104 and the determination block 107 in FIG. 2.

OS activates the interrupt handler by an interrupt triggered by any of diverse events and branches into ISRs (interrupt service routines) which cope with those events that may trigger an interrupt. If the interrupt triggering event is packet reception, the OS branches to a service routine that copes with packet reception.

As long as OS determines that inbound traffic from the network 101 is in over-traffic state, branching to the service routine for packet reception does not take place, even if an interrupt request due to packet reception occurs.

As long as OS determines that inbound traffic from the network 101 is in normal traffic state, branching to the service routine for packet reception takes place, when an interrupt request due to packet reception occurs.

An evaluation index used for the OS to make a determination may be selected from several options: e.g., "a total of time spent for processing received packets" for a predetermined interval; "frequency of interrupt occurrence due to packet reception" for a predetermined interval; "receiving a special packet" predefined to indicate a traffic state of the network 101; and a combination thereof.

Here, a case where "a total of time spent for processing received packets" is used as the evaluation index is discussed.

Under normal traffic state, the OS running on the CPU 116 measures the total time spent for processing received packets for a predetermined interval or the ratio of received packet processing time to a predetermined unit time by using the method illustrated in FIG. 12.

Under normal traffic state, the OS compares the above total time spent for processing received packets for a predetermined interval or the ratio of received packet processing time to the unit time to a predetermined threshold value. When the above measurement value as the evaluation index is equal to or greater than the threshold value, the OS determines that traffic inbound from the network 101 is under over-traffic state.

Under over-traffic state, because the OS does not branch to the service routine for packet reception, the OS does not determine state of traffic inbound from the network 101 as to time spent for processing received packets.

In this embodiment, the OS corresponds to the over-traffic determining block 108 in FIG. 2.

Here, a case where "frequency of interrupt occurrence due to packet reception" is used as the evaluation index is discussed.

By an interrupt request due to receiving a packet, an interrupt handler for processing the received packet is activated. The number of times the handler has been activated is counted and held within the OS and compared to a predetermined threshold value for every predetermined unit time to check if this count is equal to or over the threshold. When this activation count is equal to or over the threshold value, the OS determines that traffic inbound from the network 101 is under over-traffic state. If the activation count is less than the threshold value, the OS determines that inbound traffic is under normal traffic state.

In a case where receiving a special packet indicating a traffic state of the network 101 is used as the evaluation index, it is possible to determine the inbound traffic state from the network 101 by reading the Type field in the Ethernet™ header or identifying a special packet shown in FIG. 14 and following the procedure in FIG. 15 and FIG. 16.

By the above disclosed method in which the invention is implemented, the information processor to which the present invention is applied does not activate the interrupt handler for processing a received packet under the state of abnormal traffic inbound from the network 101 due to a DoS attack or a great deal of access. In consequence, the information processor can perform control over the control equipment connected to it without being occupied with processing for communication. As compared with the first and second embodiments, the OS running on the CPU 116 makes a determination and controls interrupt operation and, therefore, no special hardware is needed. In addition, it is possible to restart receive processing automatically upon the termination of the above over-traffic state.

Fourth Embodiment

Figure 18:
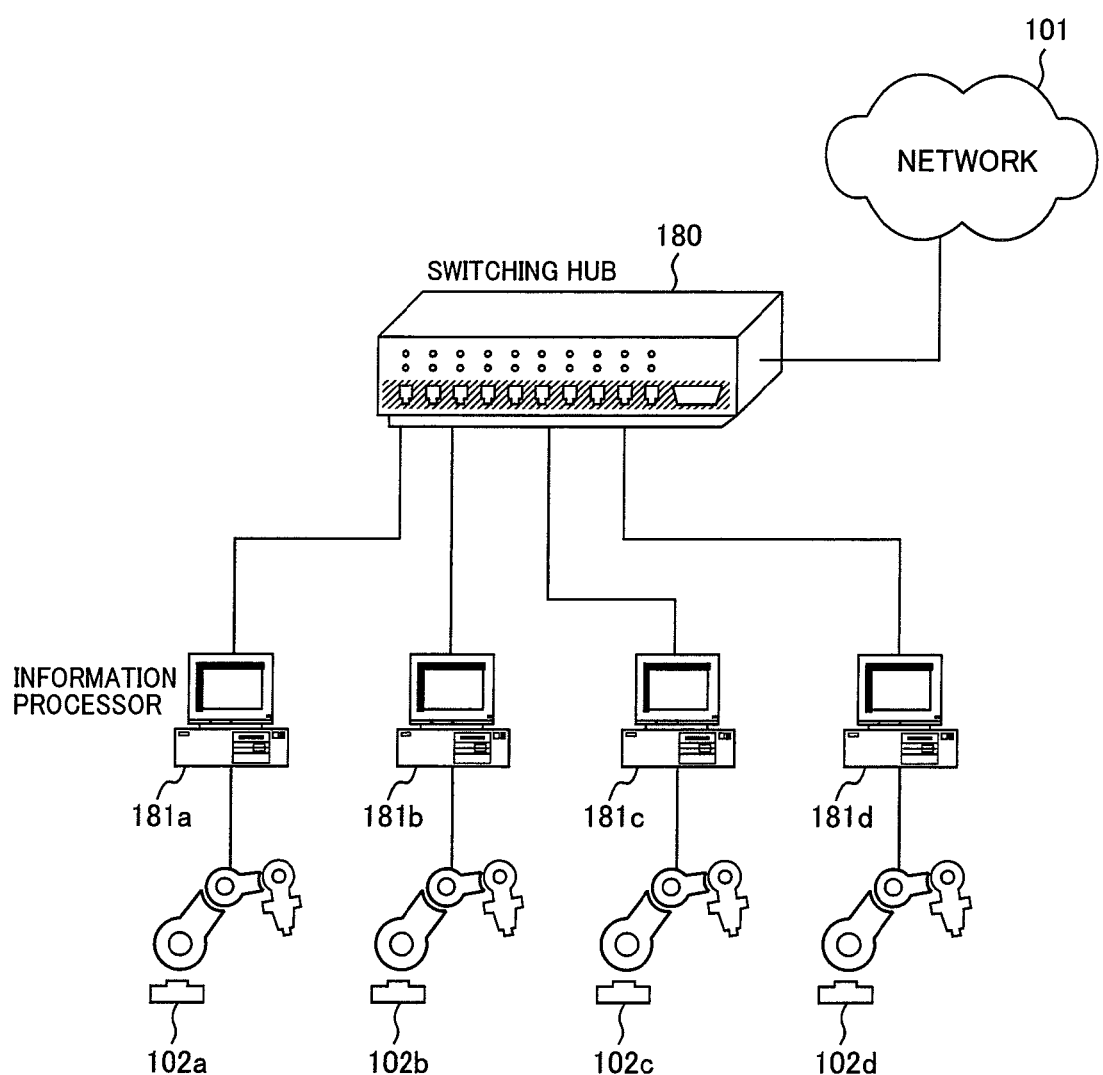
FIG. 18 shows a framework of a system to which an embodiment of the present invention is applied.

FIG. 18 shows a framework of an information processing system using a network switch 180 which is a line concentrator having a switching function and information processors 181a-d according to any of the first, second, and third embodiments. Reference numerals used in the fourth embodiment is the same as those of the corresponding functions, components, and the like described in the first, second, and third embodiments, unless otherwise noted.

The network switch 180 which is the line concentrator is connected to the information processors 181a-d and the network 101 and relays processor-to-processor communication among the information processors 181a-d and communication between each information processor 181a-d and the network 101.

The information processors 181a-d take control over their respective pieces of control equipment 102a-d and communicate with other information processors 181a-d and the network 101 via the network switch 180.

The number of information processors 181 that can connect to the network switch 180 is determined depending on the performance of the network switch 180. All of the information processors connected to the network switch 180 may not be the information processors to which the present invention is applied. If there is at least one information processor to which the present invention is applied, the benefit of the information processor to which the present invention is applied is not lost.

Figure 19:
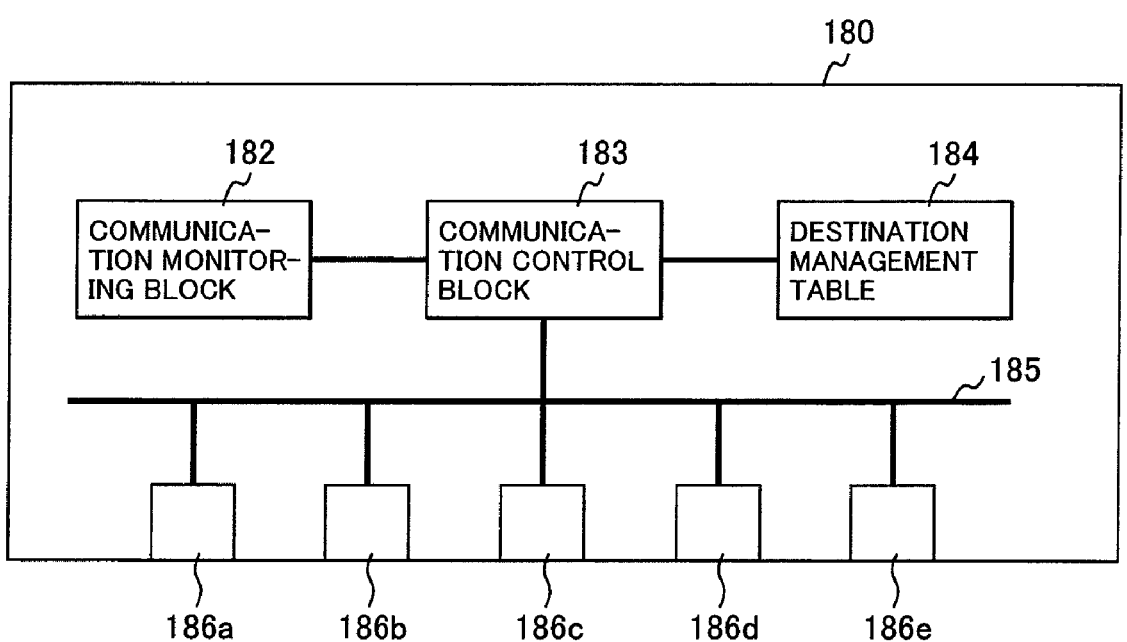
FIG. 19 shows a configuration of a network switch to which an embodiment of the present invention is applied.

FIG. 19 shows an embodiment of an internal configuration of the network switch 180 which is the line concentrator.

I/O ports 186a-e are connected to a communication control block 183 through a switching bus 185 and each I/O port has one to one connection to a peer being outside of the network switch 180 to transmit and receive packets to/from the peer. In the framework of FIG. 18, the I/O ports 186a-e are connected to the information processors 181a-d and the network 101, respectively. The communication control block 183 is connected to the I/O ports 186a-e through the switching bus 185 and directly connected to a storage (not shown) in which a destination management table 184 is stored and a communication monitoring block 182. The destination management table 184 is a table having mapping between the identifiers of destinations and the identifiers of the I/O ports 186a-e and stored in the storage.

The communication control block 183 gets a destination identifier from the header of a packet transferred to it through the switching bus 185 from one of the I/O port 186a-e, identifies any of the I/O ports 186a-e corresponding to the destination identifier from the destination management table 184, and transfers the packet to the port thus identified out of the I/O ports 186a-e on the switching bus 185. The communication control block 183 parses the packet transferred to it from one of the I/O port 186a-e and extracts and transfers various kinds of information to the communication monitoring block 182. Such information includes the identifier of the I/O ports 186a-e that received the packet, the time stamp at which the communication control block 183 received the packet, the received packet count, the received packet data size, the destination identifier, etc.

The communication monitoring block 182 periodically determines whether the peer of each I/O port 186a-e is under over-traffic state, based on such information passed from the communication control block 183. Determining whether the peer per port is under over-traffic state may be done, for example, as follows: a predetermined threshold value for a predetermined interval is set for each I/O port 186a-e; it is determined whether the packet size or packet count received by each port exceeds the threshold value; and it is determined whether the packet size or packet count transferred to each port exceeds the threshold value. Alternatively, instead of the determination on a port by port basis, after a predetermined threshold value is set for a predetermined interval, it may be determined whether a total of packet sizes or a total of packet counts received by all ports exceeds the threshold value. It may be determined whether a total of packet sizes transferred to all ports or a total of packet counts transferred to all ports exceeds the threshold value. In the latter cases, the determination is made as to whether over-traffic state is present for all ports as a whole. When it has been determined that over-traffic state is present, the result of the determination and its reason as well as information about which peer is in over-traffic state are passed to the communication control block 183. As a result of the determination, more than one peer of the I/O ports 186a-e may be regarded as being in over-traffic state.

The communication control block 183 performs predetermined processing when receiving this information from the communication monitoring block 182. This processing may include, e.g., the following: discarding packets whose destination is the peer(s) determined as being under over-traffic state; discarding packets received from the peer(s) determined as being under over-traffic state; transferring Ethernet frames in which the Type field of the Ethernet™ header is used for traffic state notification or special packets illustrated in FIG. 14 to the I/O ports 186a-e other than any I/O port(s) 186a-e regarded as being under over-traffic state; or transferring Ethernet frames in which the Type field of the Ethernet™ header is used for traffic state notification or special packets illustrated in FIG. 14 to all I/O ports 186a-e. Depending on a reason for the determination that over-traffic state is present, processing performed by the communication control block 183 may be altered.

The information processors 181a-d, when receiving the Ethernet frame or special packet illustrated in FIG. 14, determines whether inbound traffic is under over-traffic state by following the procedure illustrated in FIG. 15 and FIG. 16. As the result of the determination, in a case where inbound traffic is under over-traffic state, each information processor stops processing of received packets.

At any of the information processors 181a-d, when it determines that inbound traffic is under over-traffic state, the information processor broadcasts the Ethernet frames or special packets illustrated in FIG. 14 to other information processors 181 and then stops processing of received packets.

According to the above described embodiment, in the network constituting a system, the information processors to which the present invention is applied stop processing of received packets under abnormal traffic state due to a DoS attack or a great deal of access. In addition, the network switch 180 may monitor packets to be relayed and transferred in order to determine whether traffic is under over-traffic state; thus, it is possible to build a stable and robust network system. In a case where the network switch 180 determines that over-traffic state is present, the network switch 180 transmits to the Ethernet frames or special packets illustrated in FIG. 14 to the information processors 181; the network switch 180 leaves the decision as to whether actually received packets should be processed to each information processor 181. Therefore, it can be avoided that communication control is concentrated to only the network switch 180. For instance, supposing that the network switch 180 shuts off communication, which is only an executable operation, in the event of over-traffic state, if the network switch 180 makes an incorrect decision about the traffic state, communications with the information processors 181 connected to it are disconnected. On the other hand, in the present embodiment, even if the decision of the network switch as to the traffic state was incorrect, there remains a possibility that a correct decision is made at the information processors 181, because the network switch only transmits the Ethernet frames or special packets illustrated in FIG. 14 without shutting off communication. In consequence, the information processors can perform control over the control equipment connected thereto without being occupied with processing for communication. The information processors can restart receive processing automatically upon the termination of the above over-traffic state.

Fifth Embodiment

Figure 20:
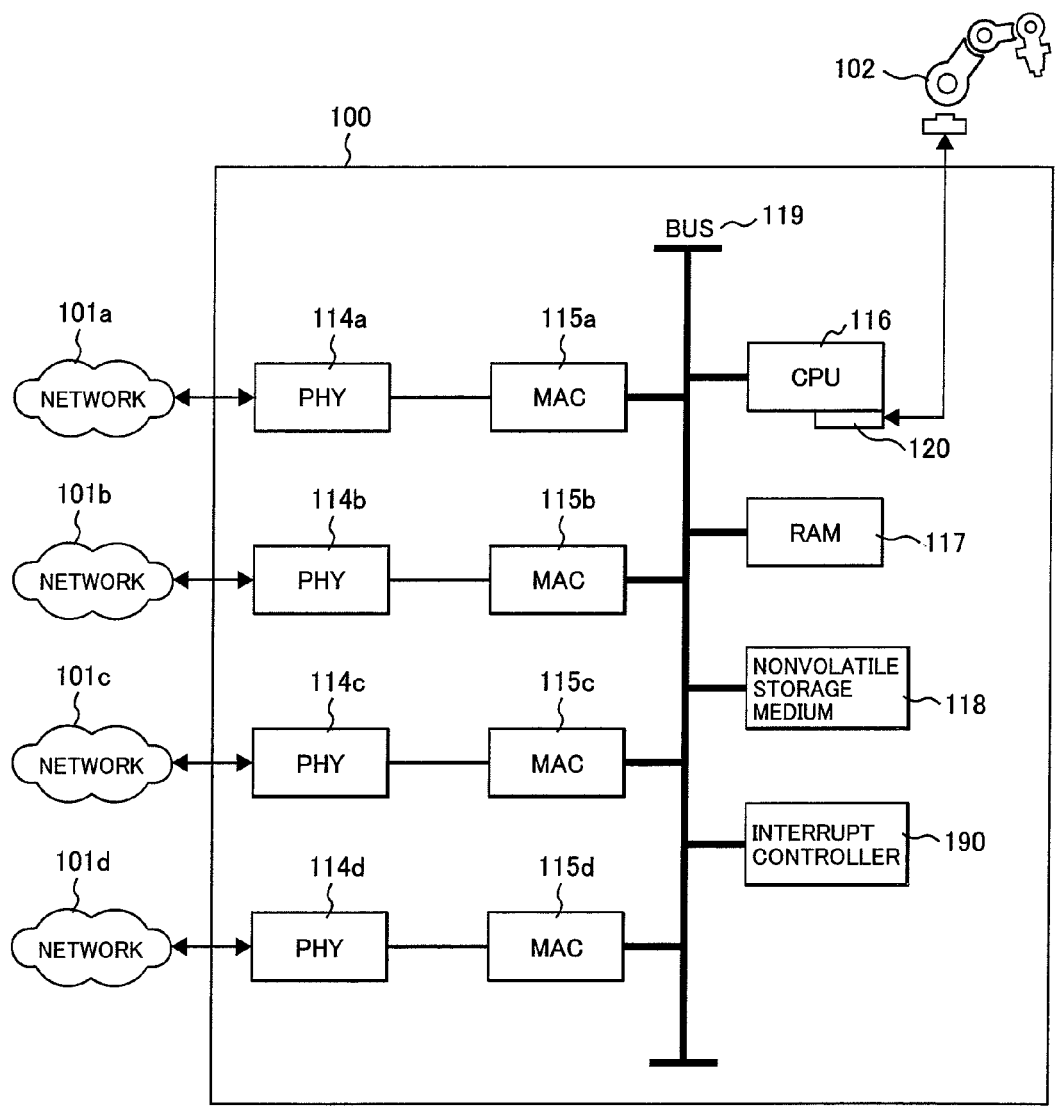
FIG. 20 shows a hardware configuration representing an embodiment of the present invention.

FIG. 20 shows an embodiment of hardware implementation of the present invention implemented in an information processor having a plurality of Ethernet™ interfaces.

Reference numerals used in the fifth embodiment is the same as those of the corresponding functions, components, and the like described in the first, second, third, and fourth embodiments, unless otherwise noted.

The information processor is equipped with a plurality of PHYs 114a-114d as communication modules, which are connected with a plurality of networks 101a-101d to transmit/receive packets, and a plurality of MACs 115a-115d.

An interrupt controller 190 is connected with a bus 119. Interrupt request signals from the MACs 115a-d are set to be sent to the interrupt controller 190. The interrupt controller 190 is configured to identify a MAC 115a-d that sent an interrupt request signal. For this purpose, for example, the MACs 115a-d is set to send interrupt requests through different interrupt signal lines, respectively, on the bus 119. According to such a way, since the interrupt controller 190 can identify a signal line on the bus 119 through which it received the interrupt request, upon arrival of an interrupt request at the interrupt controller 190, thereby, the interrupt controller 190 can identify a MAC 115 as sender from which the interrupt request was sent.

The interrupt controller 190 corresponds to the interrupt controlling block 104 and the determination block 107 in FIG. 2. The number of MACs 115 capable of being connected to the bus 119 and how to identify a MAC 115 that sent an interrupt request signal depend on specifications of the bus.

Figure 21:
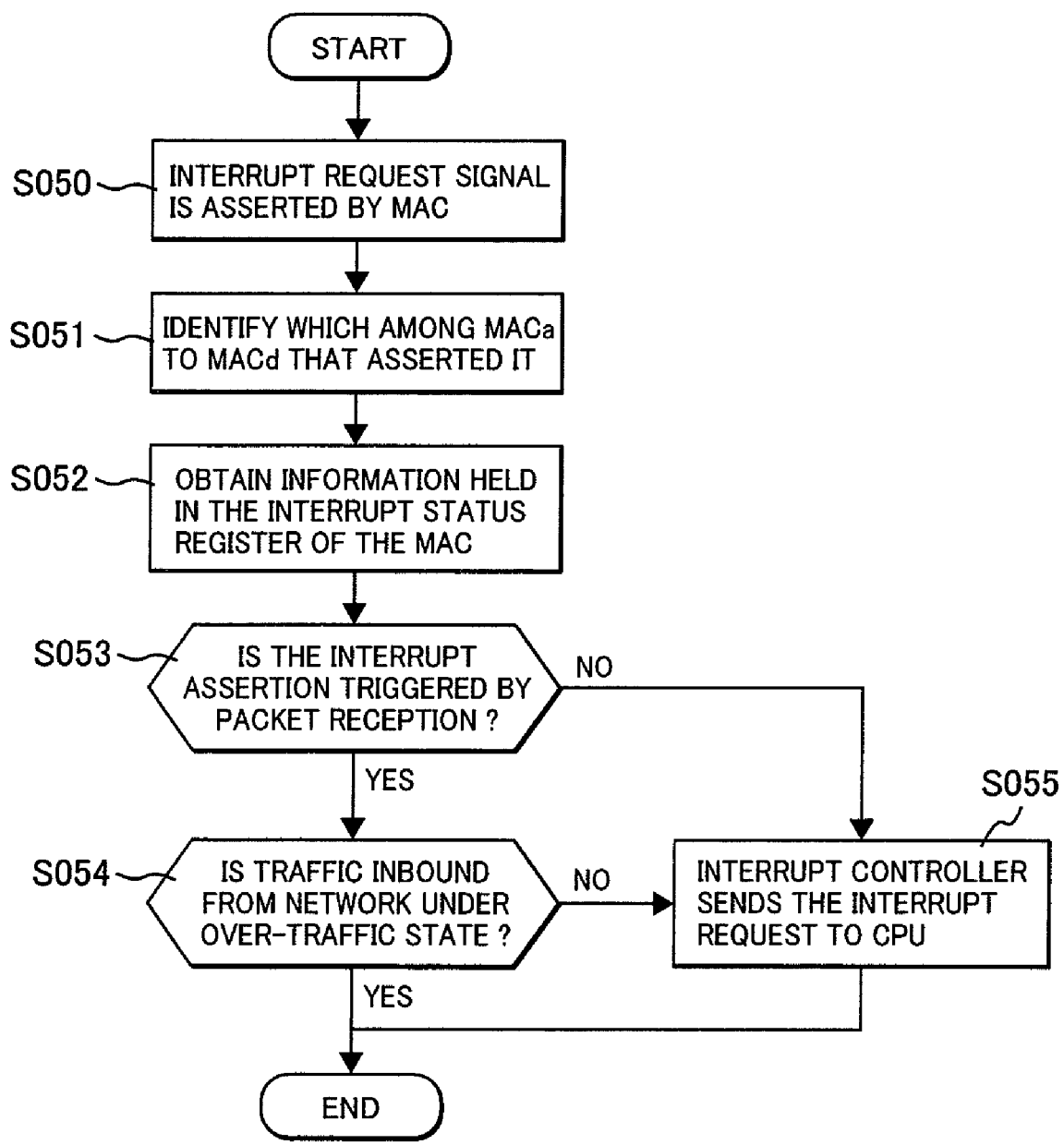
FIG. 21 illustrates a control flow according to an embodiment of the present invention.

FIG. 21 illustrates a control flow by the interrupt controller 190.

The interrupt controller 190 detects that an interrupt request signal is asserted by a MAC 115a-d (S050). The interrupt controller 190 identifies that which of the MACs 115a-d asserted the interrupt request signal (S051). Then, the interrupt controller 190 acquires information held in the interrupt status register for any MAC (any of 115a-d) that asserted the interrupt request signal, because the assertion of the interrupt request signal may be caused by any other event other than packet reception (S052).

From this interrupt status resister-information, it is determined whether packet reception is the source causing the interrupt request signal assertion (S053). As the result of this determination, when packet reception is not the source causing the assertion, the interrupt controller 190 sends the interrupt request to the CPU 116 (S055).

Conversely, when packet reception is the source causing the assertion, the interrupt controller 190 acquires traffic state inbound from any of the networks 101a-d connected to any of the MACs 115a-d that asserted the interrupt request signal and determines whether inbound traffic is in over-traffic state (S054). When the interrupt controller 190 determines that traffic inbound from any of the above networks 101a-d is under over-traffic state on a given reference for determination, the interrupt controller 190 does not pass the interrupt request to the CPU 116. When the interrupt controller 190 determines that traffic inbound from any of the networks 101a-d connected to any of the MACs 115a-d that asserted the interrupt request signal is in normal traffic state, the interrupt controller 190 passes the interrupt request to the CPU 116 (S055).

An evaluation index used in making a determination by the interrupt controller 190 may be selected from several options: e.g., "a total of time spent for processing received packets" for a predetermined interval; "frequency of interrupt occurrence due to packet reception" for a predetermined interval; "receiving a special packet" predefined to indicate a traffic state of the network 101; and a combination thereof.

In the following, each option that can be taken as the evaluation index will be explained in detail.

Under normal traffic state, the OS running on the CPU 116 measures the total time spent for processing received packets for a predetermined interval or the ratio of received packet processing time to a predetermined unit time by using the method illustrated in FIG. 12. Here, the OS prepares total time values T of processing in FIG. 12 as many as the number of MACs 115 and measures their evaluation values for each MAC 115 that received a packet. The OS gives the above measurement value an identifier corresponding to any of MAC 115a-d and sends the measurement with the identifier to the interrupt controller 190.

Under normal traffic state, the interrupt controller 190 compares the evaluation index, namely the above total time spent for processing the received packets for the predetermined interval or the ratio of received packet processing time to the unit time, to a predetermined threshold value. When the above measurement value used as the evaluation index is equal to or greater than the threshold value, the interrupt controller 190 determines that traffic inbound from any of the networks 101a-d under measurement is under over-traffic state.

Under over-traffic state, the OS does not process received packets and, therefore, no determination is made as to which state of traffic inbound from the network 101 according to time spent for processing received packets.

In this embodiment, the interrupt controller 190 corresponds to the over-traffic determining block 108 in FIG. 2.

Here, a case where "frequency of interrupt occurrence due to packet reception" is used as the evaluation index is described.

An interrupt request due to packet reception is sent from the MACs 115a-d to the interrupt controller 190 through the bus 119. At this time, the interrupt request from the MACs 115a-d to the interrupt controller 190 is sent by asserting the interrupt request signal.

The number of times the interrupt request signal has been asserted is counted and stored for MAC 115a-d in an internal register (not shown) provided in the interrupt controller 121.

The interrupt controller 121 compares the above internal register value to a predetermined threshold value for a predetermined interval. The threshold value and the interval may be set in the same manner as described for the interrupt controller 121 in the first embodiment.

As a result of the comparison between the number of times the interrupt request signal has been asserted and the above threshold value, when the number of times the signal has been asserted is equal to or more than the threshold value, the interrupt controller 190 determines that inbound traffic is under over-traffic state. When the number of times the signal has been asserted is less than the threshold value, the interrupt controller 190 determines that inbound traffic is under normal traffic state.

In a case where "receiving a special packet" predefined to indicate a traffic state of each network 101a-d is used as the evaluation index, it is possible to determine the inbound traffic state from the network 101 by reading the Type field in the Ethernet™ header or identifying a special application-layer packet shown in FIG. 14 and following the procedure in FIG. 15 and FIG. 16. The determination procedure is performed for each of the networks 101*a-d* and each of the MACs 115*a-d* connected respectively to the networks.

The interrupt controller 190 needs to have internal storages for the above evaluation index values as many as the number of the MACs 115. For example, when a total of time spent for processing received packets is used as the evaluation index and n pieces of MACs 115 are employed, the interrupt controller 190 needs to have n pieces of internal registers and threshold registers (not shown) to store values of the total time spent for processing received packets for MAC 115. A common threshold register may be provided instead of individual threshold registers for MAC.

Figure 22:
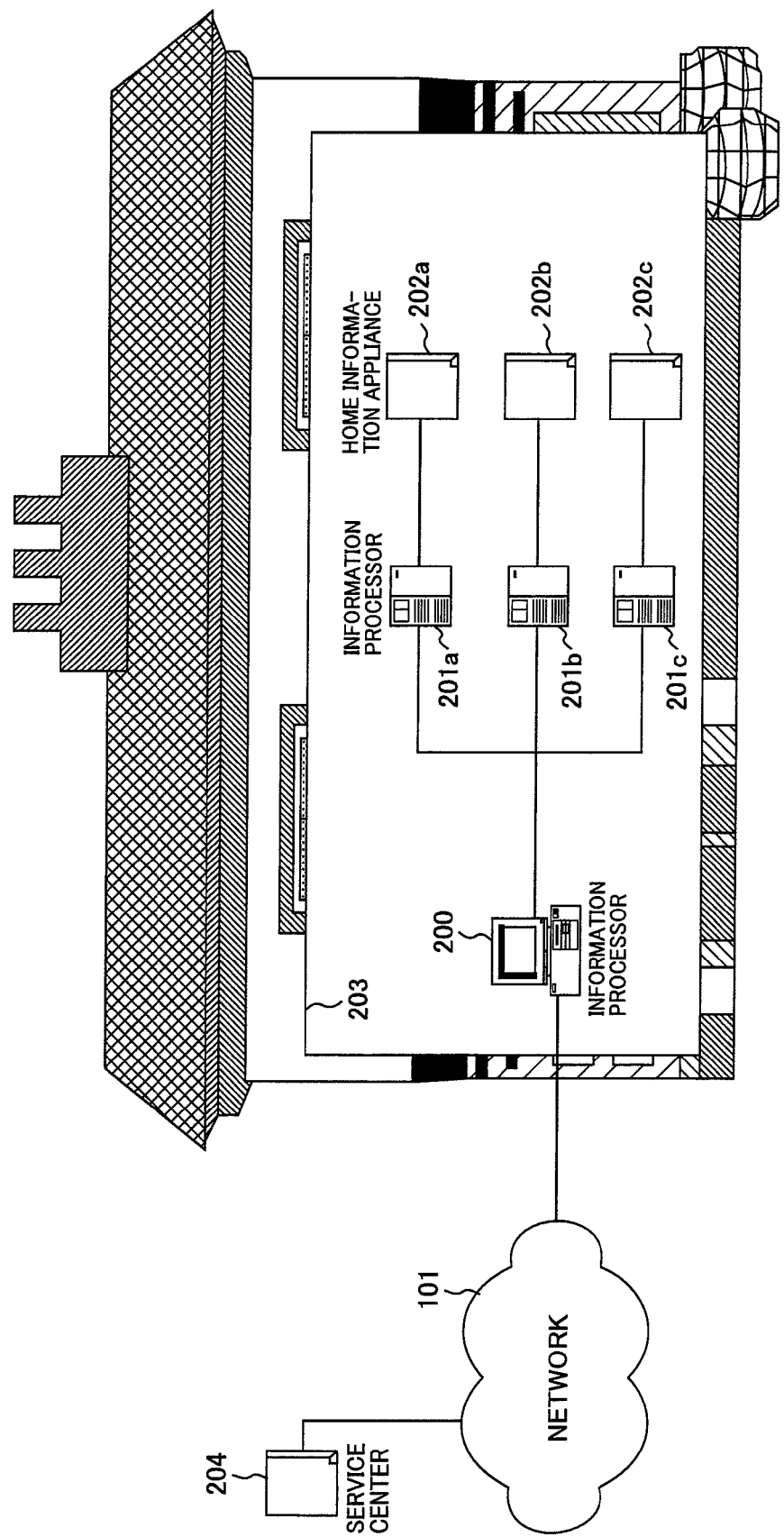
FIG. 22 shows a framework of a system to which an embodiment of the present invention is applied.

FIG. 22 shows an embodiment of an information processing system wherein the information processor to which the present invention is applied, shown in FIG. 20, is provided as a home server.

A first information processor 200 is the information processor 100 to which the present invention is applied, shown in FIG. 20, and relays communication between a home network 203 and a network 101.

The home network 203 is a network comprising the first information processor 200, a plurality of second information processors 201*a-c*, and home information appliances 202*a-c*.

The second information processors 201*a-c* are information processing terminals that take control and monitoring over the home information appliances 202*a-c* connected thereto respectively. The second information processors 201*a-c* are connected with the first information processor 200, send information about the activity of the home information appliances 202*a-c* to the first information processor 200, and send a control command from the first information processor 200 to the home information appliances 202*a-c* connected thereto. The second information processors may be incorporated in the home appliances respectively.

An embodiment of a second information processor may be, for example, a supervisory terminal. Information about the activity of the home information appliances 202*a-c* may include, e.g., power consumption amount, operating duration, operation on/off, temperature, operation history, software version, etc. Control commands from the first information processor 200 may include, e.g., power on, power shutdown, operation start and stop specific to an home information appliance, software upgrade, etc.

The first information processor 200 temporarily stores information acquired from the second information processors 201*a-c*, performs predetermined information processing thereon, and transmits such information to a service center 204 connected to the network 101 at given intervals. The service center 204 acquires the above activity information from the first information processor 200, parses it, and provides certain services via the network 101. The services may include, e.g., a remote monitoring service, a remote maintenance and check service, and a software upgrade service.

According to the above described embodiment, when traffic from the network 101 to the first information processor 200 becomes over-traffic state because of a DoS attack or the like, the first information processor of the present invention, once having determined that over-traffic state is present, does not process packets received from the network 101 and the second information processors 201. But, under normal traffic state, information about activity of the corresponding home information appliances 202*a-c* can continue to be stored in one or more second information processors 201.

Upon the termination of over-traffic state in the network 101, stored data can be transmitted outbound to the network 101 and to the service center 204. Thus, providing an ongoing service can be resumed by using the data stored during the over-traffic state inbound from the network 101.

Sixth Embodiment

Figure 23:
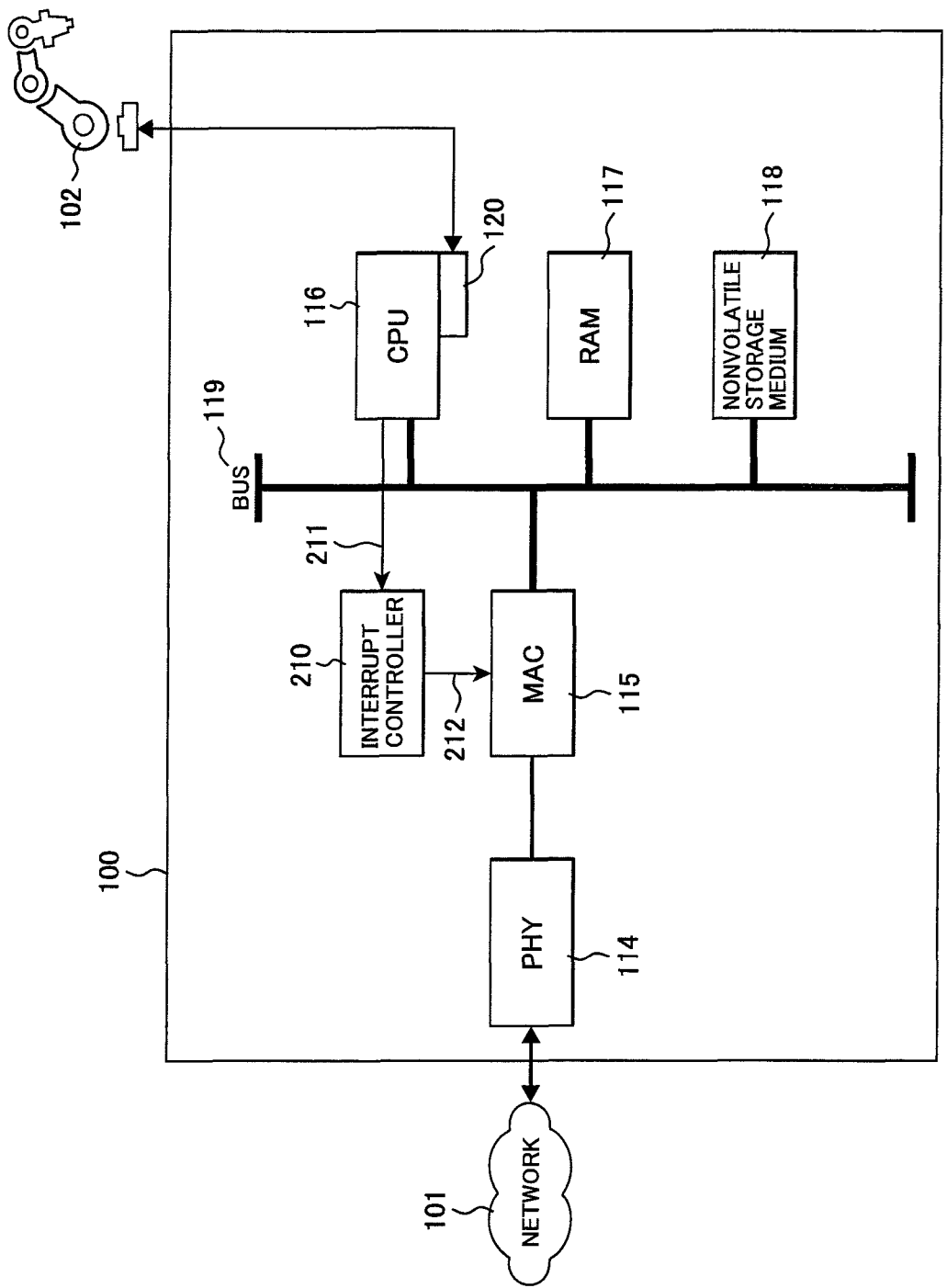
FIG. 23 shows a hardware configuration representing an embodiment of the present invention.

FIG. 23 shows an embodiment of hardware implementation of the present invention implemented in an information processor having an Ethernet™ interface. An example of a system framework in which the present embodiment is used is the same as shown in FIG. 1.

Reference numerals used in the sixth embodiment is the same as those of the corresponding functions, components, and the like described in the first through fifth embodiments, unless otherwise noted.

An interrupt controller 210 is connected to the CPU 116 through a signal line of interrupt input 211 and to the MAC 115 through a signal line of interrupt output 212.

Figure 24:
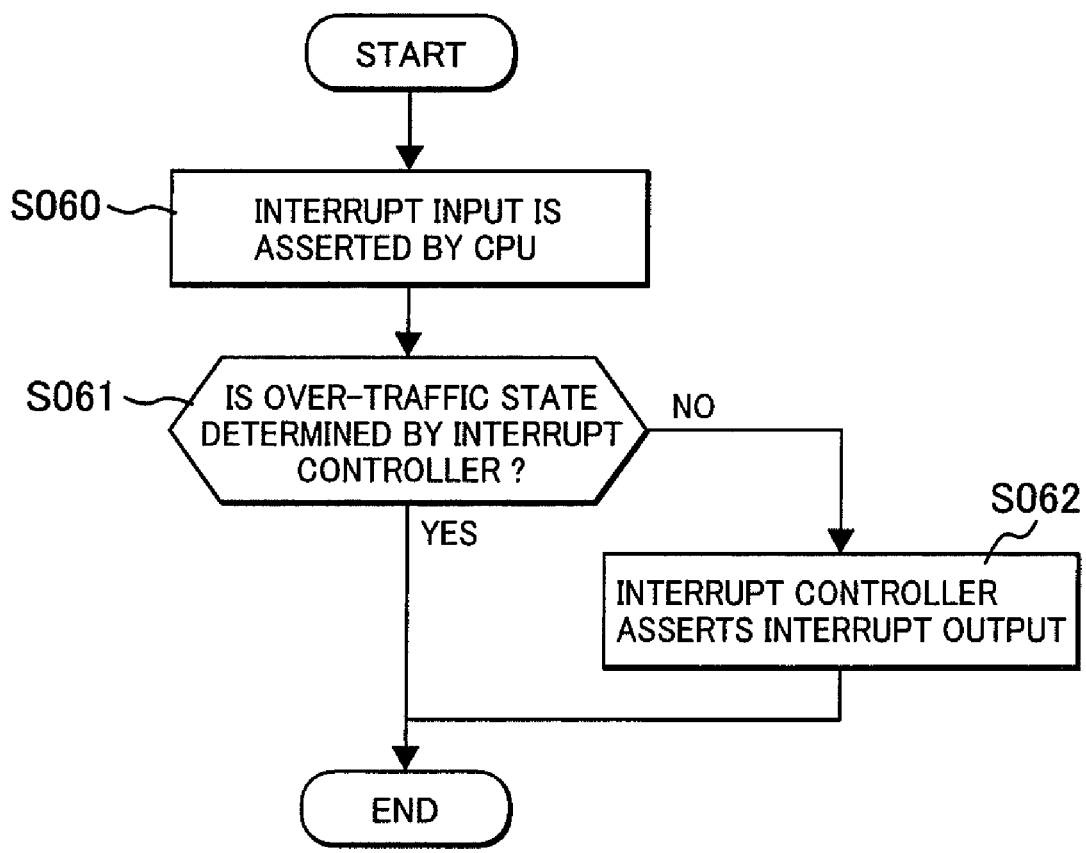
FIG. 24 illustrates a control flow according to an embodiment of the present invention.

FIG. 24 illustrates an operation flow of packet transmission.

When the OS running on the CPU 116 transmits a normal packet, the CPU asserts the interrupt input 211 at S060 and transmits the packet to the MAC 115.

When the interrupt controller 210 detects that the interrupt input 211 has been asserted, the interrupt controller 210 determines whether transmission performed by the OS running on the CPU 116 is over-traffic state or normal traffic state (S061). If transmission is over-traffic state, as determined in this step, the interrupt controller 210 does not assert the interrupt output 212 (S061). Otherwise, if transmission is normal traffic state, as determined in this step, the interrupt controller 210 asserts the interrupt output 212 (S062).

The MAC 115 transmits the packet to the PHY 114 at the time when the interrupt output 212 is asserted.

An evaluation index used in making a determination by the interrupt controller 210 may be selected from several options: e.g., "a total of time spent for processing transmission packets" for a predetermined interval; "frequency of interrupt occurrence due to packet transmission" for a predetermined interval; and a combination thereof.

A case where "a total of time spent for processing transmission packets" is used as the evaluation index is discussed.

Under normal traffic state, the OS running on the CPU 116 processes transmission packets. Therefore, the interrupt controller 210 acquires the following from the OS running on the CPU 116: namely, a total of time spent for processing transmission packets for a predetermined interval or a ratio of transmission packet processing time to a predetermined unit time.

Figure 25:
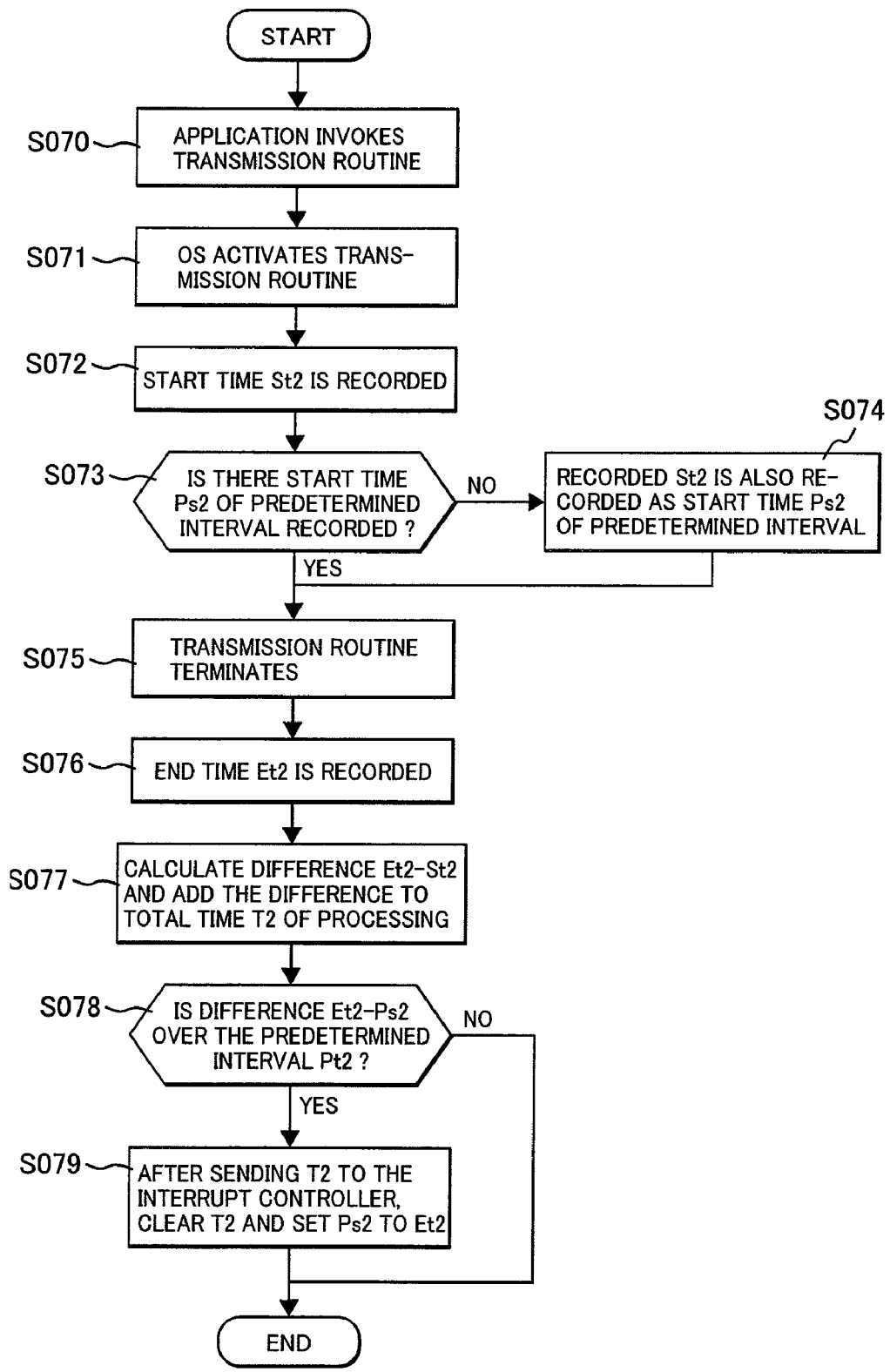
FIG. 25 illustrates a method for measuring time spent for processing according to an embodiment of the present invention.

A method for measuring time spent for processing transmission packets is illustrated in FIG. 25.

An application of the OS running on the CPU 116 invokes a transmission routine (S070). The OS starts the invoked transmission routine (S071). This start time St2 is recorded (S072). The time can be measured by reading a counter value of an internal timer of the CPU and multiplying the counter value by a reciprocal number of a clock frequency or by using a time acquisition function provided by the OS. Then, it is determined whether there is the start time Ps2 of a predetermined interval recorded (S073). If Ps2 is not recorded, Ps2 is set equal to St2 (S074). If Ps2 is recorded, wait until the transmission routine terminates (S075). The end time Ets of the transmission routine is recorded (S076). After calculating a time difference (Et2−St2) between the start time and the end time of the transmission routine, the difference is added to the total time T2 of processing (S077).

Then, difference (Et2−Ps2) between the end time of the transmission routine and the start time of the predetermined interval is calculated and it is determined whether the difference is over the interval Pt2 (S078). If Et2−Ps2 is over Pt2, the total time T2 of processing until now is sent to the interrupt controller 210, T2 is cleared, and, Ps2 is set to Et2 (S079). If Et2−Ps2 is less than Pt2, this procedure terminates.

Under normal traffic state, when the above total time spent for processing transmission packets or the ratio of cumulative transmission packet processing time to the unit time is equal to or more than a predetermined threshold value, the interrupt controller 210 determines that transmission is under over-traffic state.

Here, a case where "frequency of interrupt occurrence due to packet transmission" for a predetermined interval is used as the evaluation index is described.

An interrupt request due to packet transmission is sent from the CPU 116 through the interrupt controller 210 to the MA 115. At this time, the interrupt request from the CPU 116 to the interrupt controller 210 is sent by asserting the interrupt input 211.

The number of times the interrupt input 211 has been asserted is counted and stored in an internal register of the interrupt controller 210. The interrupt controller 210 compares the value of the above internal register to a predetermined threshold value at the end of a predetermined interval. The threshold value and the interval may be set in the same manner as described for the interrupt controller 121 in the first embodiment.

As a result of the comparison between the number of times the interrupt input 211 has been asserted and the above threshold value, if the number of times the interrupt input has been asserted is equal to or more than the threshold value, the interrupt controller 210 determines that the information processor 100 is under over-traffic state and does not assert the interrupt output 212 even if the interrupt input 211 from the CPU 116 is asserted.

If the number of times the interrupt input has been asserted is less than the threshold value, the interrupt controller 210 determines that the information processor 100 is under normal state and asserts the interrupt output 212 when the interrupt input 211 from the CPU 116 is asserted.

The determination by interrupt occurrence frequency used as the evaluation index can be carried out by replacing the interrupt input 112 in FIG. 8 with the interrupt input 211.

By the above disclosed method in which the invention is implemented, the information processor 100 to which the present invention is applied stops transmission processing under abnormal traffic state of the information processor 100, even in case the OS running on the CPU 116 is infected by a computer virus and performs a DoS attack. In consequence, it is possible to reduce the effects on other information processors connected to the network 101 without increasing the communication load of the network 101. The information processor can restart transmission processing automatically upon the termination of the above over-traffic state.

Seventh Embodiment

Figure 26:
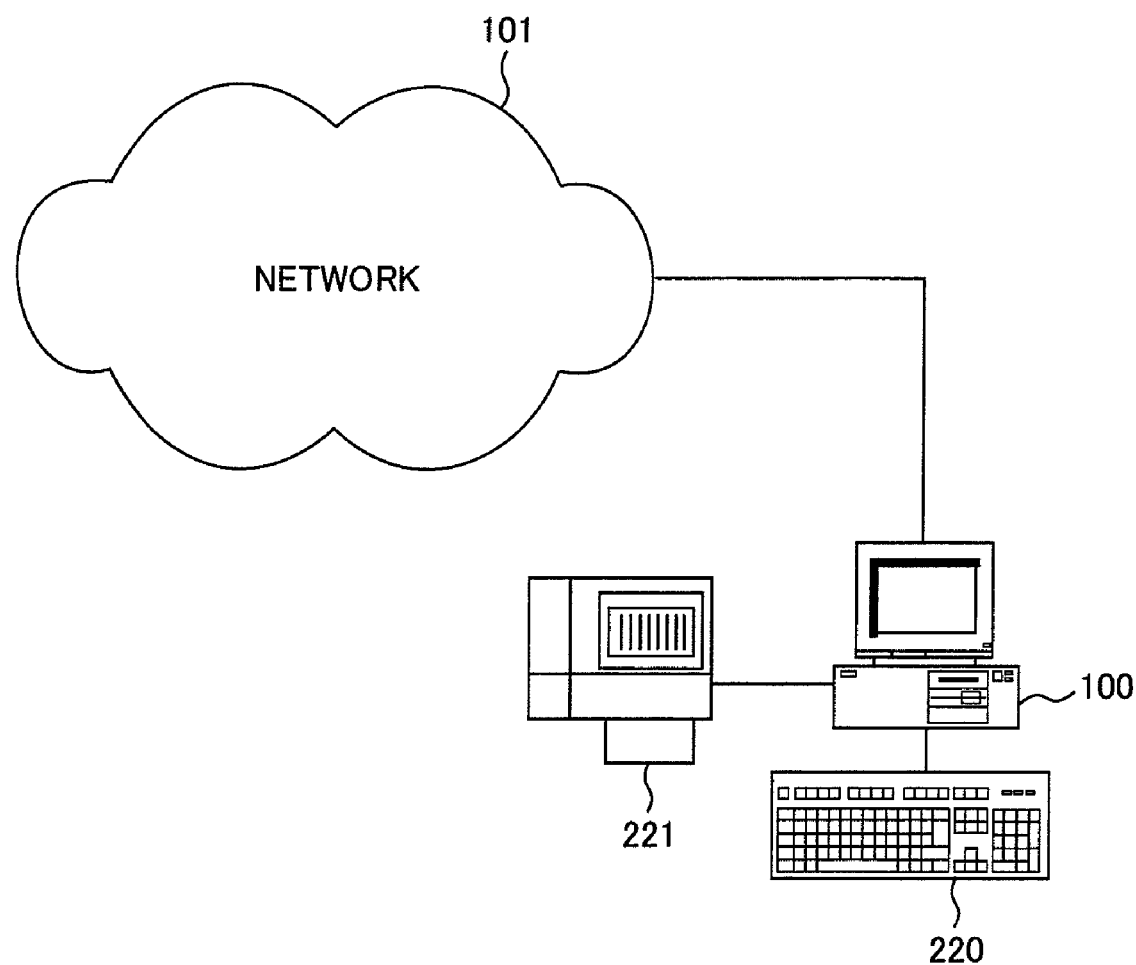
FIG. 26 shows a framework of a system to which an embodiment of the present invention is applied.

FIG. 26 shows an embodiment of an information processing system using an information processor to which the present invention is applied. The information processor 100 is connected to a network 101, a data input block 220, and a data output block 221.

Figure 27:
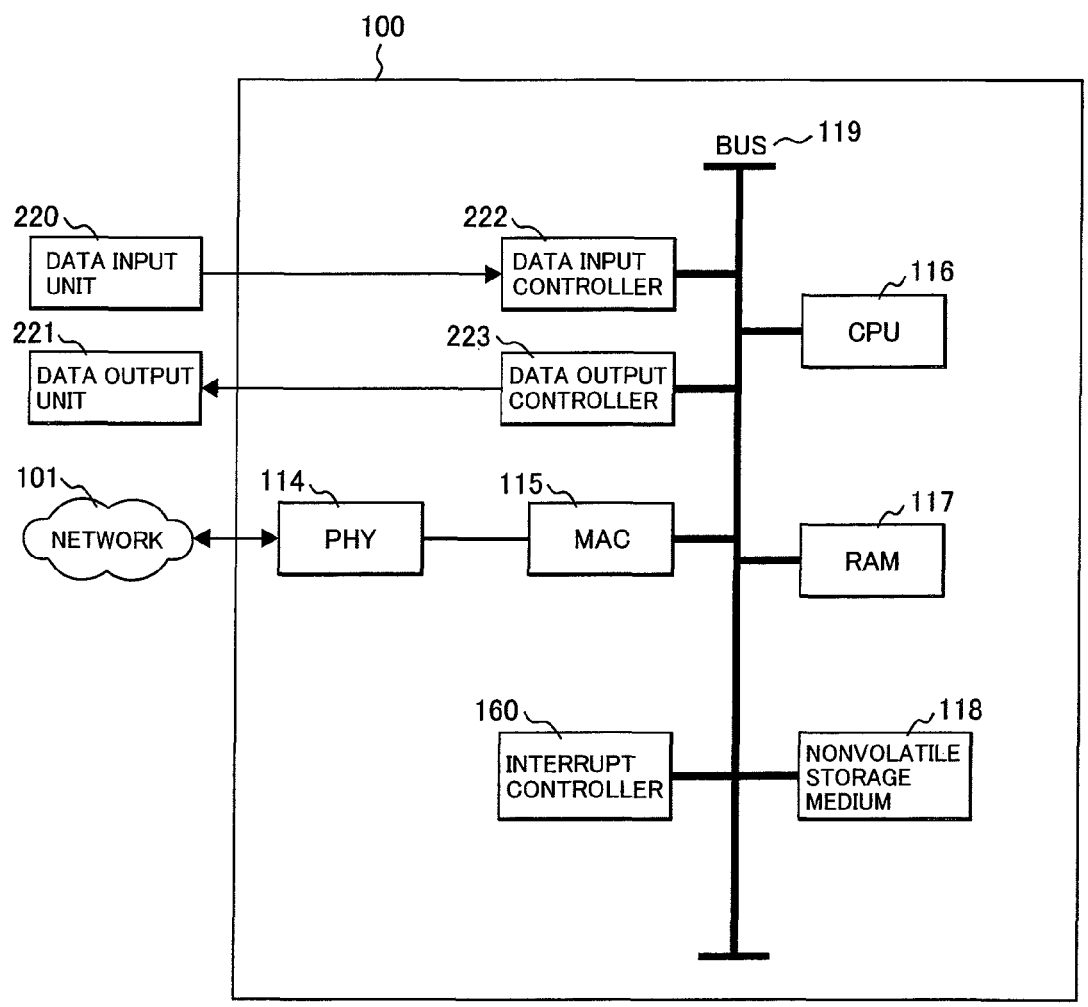
FIG. 27 shows a hardware configuration representing an embodiment of the present invention.

FIG. 27 shows an embodiment of an internal configuration of the information processor in FIG. 26.

Reference numerals used in the seventh embodiment is the same as those of the corresponding functions, components, and the like described in the first, second, third, fourth, fifth, and sixth embodiments, unless otherwise noted.

The data input block 220 is connected with a data input controller 222 and is used for externally inputting data to the information processor 100. Input data is transferred to the data input controller 222. The data input block 220 may be included in the information processor 100 without losing the benefit of the present invention. An embodiment of the data input block 220 may include, e.g., a mouse, a keyboard, a joystick, an operating panel, and a touch panel, etc.

The data input controller 222 is connected with the data input block 220 and the bus 119. When data is input from the data input block 220, the data input controller 222 asserts an interrupt request signal indicating that data has been input to the bus 119 and transfers the input data to the CPU 116.

The output block 221 is connected with a data output controller 223 and is used for outputting data output from the information processor 100. The data output block 221 may be included in the information processor 100 without losing the benefit of the present invention. An embodiment of the data output block may include, e.g., a display, a printer, etc.

The data output controller 223 is connected with the data output block 221 and with the bus 119 and transfers data output from the CPU 116 to the data output block 221.

The operator enters any data from the data input block 220, causes the CPU 116 or the OS running on the CPU 116 to perform certain information processing and, if required, output the result of the processing to the data output block 221. Examples of such operation include creating an electronic document and displaying the pages thereof, executing an calculation simulator and printing the result of the simulation, and so on. If required, the network 101 is utilized. Examples hereof include transmitting and receiving e-mail, web browsing, and transmitting and receiving simulation data.

According to the above described embodiment, in the event that traffic from the network 101 to the information processor 100 has become over-traffic state because of a DoS attack or the like, the information processor of the present invention, once having determined that over-traffic state is present, does not process packets received from the network 101. Hence, it is possible to perform information processing using the information processor 100 without being occupied with processing for communication.

Upon the termination of over-traffic state in the network 101, it is possible to resume information processing utilizing the network 101.

What is claimed is:

1. An information processor that is used in connection with a network and takes control over control equipment, the information processor comprising:

a communication block which receives packets from the network and generates an interrupt request signal;

a data processing block which processes received packets and generates control command data for controlling the control equipment;

an interrupt controlling block which controls outputting said interrupt request signal to said data processing block; and a determination block which determines whether traffic inbound from the network is under over-traffic state or normal traffic state, based on information about communication output from at least one of said communication block, said data processing block, and said interrupt controlling block, and outputs a result of the determination to said interrupt controlling block, wherein, based on said result of the determination input from said determination block, if the result of the determination is that traffic inbound from the network is under over-traffic state, said interrupt controlling block shuts off output of the interrupt request signal from said interrupt controlling block to said data processing block, and if the result of the determination is that traffic inbound from the network is under normal traffic state, said interrupt controlling block outputs the interrupt request signal from said interrupt controlling block to said data processing block, and wherein, said data processing block, upon taking input of said interrupt request signal, processes a packet received from said communication block.

2. The information processor according to claim 1, wherein said determination block comprises an over-traffic determining block which determines whether traffic inbound from said network is under over-traffic state, a normal traffic determining block which determines whether traffic inbound from said network is under normal traffic state, and a determination control block which decides a result of determination as to inbound traffic state from the network, based on determination information from said over-traffic determining block and said normal traffic determining block, and outputs the decided result of determination to said interrupt controlling block.

3. The information processor according to claim 2, wherein said data processing block measures a total of time spent for receive processing of received packets or a ratio of received packet processing time to a unit time; and wherein, when said total of time spent for receive processing measured by said data processing block is equal to or greater than a predetermined threshold value, or when the ratio of received packet processing time to the unit time is equal to or greater than a predetermined threshold value, said over-traffic determining block in said determination block determines that traffic inbound from the network is over-traffic state.

4. The information processor according to claim 2, wherein said communication block and said interrupt controlling block measure the frequency of interrupt occurrence due to packet reception; and wherein, in said determination block, when said frequency of interrupt occurrence measured by said communication block and said interrupt controlling block is equal to or more than a predetermined threshold value, said over-traffic determining block determines that traffic inbound from the network is under over-traffic state; when said frequency of interrupt occurrence is less than the predetermined threshold value, said normal traffic determining block determines that traffic inbound from the network is under normal traffic state.

5. The information processor according to claim 1, wherein, said communication block or said interrupt controlling block, upon regarding a packet received from the network as a special packet indicating a traffic state of the network, determines whether said special packet indicates over-traffic state or normal traffic state, and outputs a result of the determination to said determination block.

6. The information processor according to claim 1, wherein, during an interrupt request due to receiving a packet via said communication block, said determination block integrates a high-level voltage signal, compares the integrated output value to a predetermined reference voltage value, when said integrated output value is greater than said reference voltage value, said determination block asserts the determination result to be output to said interrupt controlling block; when said integrated output value is less than said reference voltage value, said determination block negates the determination result to be output to said interrupt controlling block.

7. The information processor according to claim 1, wherein said determination block is a switch, the determination result to be output to said interrupt controlling block is asserted when the switch is on, and the determination result to be output to said interrupt controlling block is negated when the switch is off; and wherein said interrupt controlling block determines that traffic inbound from said network is in over-traffic state when the determination result input thereto is asserted, and determines that traffic inbound from said network is in normal traffic state when the determination result input thereto is negated.

8. The information processor according to claim 1, further including an indicator to indicate an inbound traffic state from said network, wherein said interrupt controlling block outputs the result of the determination as to inbound traffic state from said network to said indicator.

9. The information processor according to claim 8, wherein said indicator is a light emitting diode and goes on when inbound traffic from said network is over-traffic state.

10. An information processor that is used in connection with a plurality of networks and takes control over control equipment, the information processor comprising:

a plurality of communication blocks which receive packets from said plurality of networks and generate an interrupt request signal;

a data processing block which processes received packets and generates control command data for controlling the control equipment; and an interrupt controlling block, which determines whether traffic inbound from the plurality of networks to which the information processor is connected is under over-traffic state or normal traffic state, based on information about communication output from at least one of said plurality of communication blocks and said data processing block, and which outputs the identifier of a network where the determination was done and a result of the determination for the network corresponding to said identifier, wherein, based on said result of the determination, when the result of the determination is that traffic inbound from the network where the determination was done is in over-traffic state, said interrupt controlling block shuts off output of said interrupt request signal input from said communication blocks to said data processing block; when the result of the determination is that traffic inbound from the network is in normal traffic state, said interrupt controlling block outputs said interrupt request signal input from said communication blocks to said data processing block.

11. An information processing system comprising:

a plurality of information processors which take control over a plurality of control equipment, respectively, and are assigned unique identifiers; and a line concentrator connected to said plurality of information processors;

wherein said concentrator comprising:

a plurality of I/O ports connected with said network and said plurality of information processors and used for transmitting and receiving packets;

a storage in which a destination management table is stored, wherein the destination management table has mapping between the identifiers assigned to said information processors and the identifiers of said I/O ports corresponding to said identifiers;

a communication control block which identifies the identifier of the corresponding I/O port from the destination identifier specified in a packet received from one of said I/O ports, by using on said destination management table, and transfers the received packet to the identified I/O port; and a communication monitoring block which determines whether the peer of each of said I/O ports to which packets are transmitted is in over-traffic state or normal traffic state;

wherein said communication control block, when a packet is received, outputs packet reception information to said communication monitoring block, wherein said communication monitoring block determines whether the peer of each of said I/O ports is in over-traffic state or normal traffic state, based on said reception information, and outputs a result of the determination to said communication control block, and wherein, based on said result of the determination received from said communication monitoring block, when the peer of each of said I/O ports to which packets are transmitted is in over-traffic state, said communication control block discards a packet addressed to said peer or discards a packet received from said peer.

12. The information processing system according to claim 11, wherein said packet reception information is at least any one of the following information: I/O port identifier that received the packet, time stamp at which the packet was received, received packet count, received packet data size, and peer's identifier.

13. The information processing system according to claim 12, wherein said communication monitoring block determines whether the peer of each of said I/O ports is in over-traffic state by determining whether a total of data sizes of packets received at all of said plurality of I/O ports or a total of counts of the packets received exceeds a predetermined threshold value.

14. The information processing system according to claim 12, wherein said communication monitoring block determines whether the peer of each of said I/O ports is in over-traffic state by determining whether a total of data sizes of packets transferred to each of said plurality of I/O ports or a total of counts of the packets transferred exceeds a predetermined threshold value.

15. The information processing system according to claim 11, wherein said communication monitoring block determines for each of said I/O ports whether the peer of said I/O port to which packets are transmitted is in over-traffic state or normal traffic state, based on said packet reception information.

* * * * *